United States Patent
Chen et al.

(10) Patent No.: US 12,085,637 B2
(45) Date of Patent: Sep. 10, 2024

(54) METHOD AND APPARATUS FOR POSITIONING TERMINAL DEVICE

(71) Applicant: Huawei Technologies Co., Ltd., Shenzhen (CN)

(72) Inventors: Lei Chen, Chengdu (CN); Su Huang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 118 days.

(21) Appl. No.: 17/403,466

(22) Filed: Aug. 16, 2021

(65) Prior Publication Data

US 2021/0373148 A1 Dec. 2, 2021

Related U.S. Application Data

(63) Continuation of application No. PCT/CN2020/074861, filed on Feb. 12, 2020.

(30) Foreign Application Priority Data

Feb. 15, 2019 (CN) .......................... 201910117837.7

(51) Int. Cl.
*G01S 13/76* (2006.01)
*G01S 13/87* (2006.01)
*H04W 64/00* (2009.01)

(52) U.S. Cl.
CPC .......... *G01S 13/765* (2013.01); *G01S 13/878* (2013.01); *H04W 64/00* (2013.01)

(58) Field of Classification Search
CPC .... G01S 13/765; G01S 13/878; H04W 64/00; H04W 64/006
See application file for complete search history.

(56) References Cited

U.S. PATENT DOCUMENTS

2017/0026798 A1* 1/2017 Prevatt ................. H04W 4/023
2018/0220392 A1* 8/2018 Ly ......................... H04W 64/00
(Continued)

FOREIGN PATENT DOCUMENTS

| CN | 101064554 A | 10/2007 |
| CN | 103004267 A | 3/2013 |

(Continued)

OTHER PUBLICATIONS

Qualcomm Incorporated: R1-1900916 "RAT-dependent DL and UL NR positioning techniques", 3GPP Draft;, Mobile Competence Centre ; 650, Route Des Lucioles ; F-06921 Sophia-Antipolis Cedex, vol. RAN WG1, No. Taipei, Taiwan; Jan. 21, 2019-Jan. 25, 2019 Jan. 20, 2019 (Year: 2019).*

(Continued)

*Primary Examiner* — Umair Ahsan
(74) *Attorney, Agent, or Firm* — Leydig, Voit & Mayer, Ltd.

(57) ABSTRACT

A method and an apparatus for positioning a terminal device. The method includes: generating, by a terminal device, a first message, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal; and sending, by the terminal device, the first message to a network device.

20 Claims, 5 Drawing Sheets

(56) References Cited

U.S. PATENT DOCUMENTS

| | | | |
|---|---|---|---|
| 2019/0037529 A1* | 1/2019 | Edge | .................. H04L 1/04 |
| 2019/0045477 A1 | 2/2019 | Edge | |
| 2019/0380056 A1 | 12/2019 | Lee et al. | |

FOREIGN PATENT DOCUMENTS

| | | |
|---|---|---|
| CN | 103703841 A | 4/2014 |
| CN | 103856894 A | 6/2014 |
| CN | 108702726 A | 10/2018 |
| CN | 108882382 A | 11/2018 |
| CN | 109150250 A | 1/2019 |
| CN | 109150272 A | 1/2019 |
| CN | 109151885 A | 1/2019 |
| EP | 2747498 A1 | 6/2014 |
| JP | 2011525969 A | 9/2011 |
| WO | 2009157823 A1 | 12/2009 |
| WO | 2014071563 A1 | 5/2014 |
| WO | 2018159967 A1 | 9/2018 |
| WO | 2019027595 A1 | 2/2019 |

OTHER PUBLICATIONS

Ericsson, "RAT dependent NR positioning solutions," 3GPP TSG-RAN WG1 #94b, Chengdu, P.R. China, R1-1811530, total 10 pages, 3rd Generation Partnership Project, Valbonne, France (Oct. 8-12, 2018).

"RAT-dependent DL and UL NR positioning techniques [online]," 3GPP TSG-RAN WG1 Meeting AH1901, Taipei, Taiwan, R1-1900916, Total 8 pages, 3rd Generation Partnership Project, Valbonne, France (Jan. 21-25, 2019).

Huawei et al., "Consideration on multi-RTT positioning in NR," 3GPP TSG-RAN WG2 Meeting #105, R2-1901284, Athens, Greece, Total 4 pages, 3rd Generation Partnership Project, Valbonne, France (Feb. 25-Mar. 1, 2019).

Ericsson, "RAT dependent NR positioning solutions," 3GPP TSG-RAN WG1 #95, Spokane, United States, R1-1813592, total 17 pages, 3rd Generation Partnership Project, Valbonne, France (Nov. 12-16, 2018).

Intel Corporation, "Further discussion on eCID positioning for NB-IoT," 3GPP TSG-RAN WG4 Meeting #80bis, Ljubljana, Slovenia, R4-1609104, total 5 pages, 3rd Generation Partnership Project, Valbonne, France (Oct. 10-14, 2016).

Ericsson, "RAT dependent NR positioning solutions," 3GPP Tsg-Ran WG1 #94b, Chengdu, p. R. China, R1-1811530, total 12 pages, 3rd Generation Partnership Project, Valbonne, France (Oct. 8-12, 2018).

Qualcomm Incorporated, "RAT-dependent DL and UL NR positioning techniques," 3GPP TSG-RAN WG1 Meeting AH1901, Taipei, Taiwan, R1-1900916, total 7 pages. 3rd Generation Partnership Project, Valbonne, France (Jan. 21-25, 2019).

"3rd Generation Partnership Project; Technical Specification Group Radio Access Network; NR; Physical layer procedures for data (Release 15)," 3GPP TS 38.214 V15.4.0, total 102 pages, 3rd Generation Partnership Project, Valbonne, France (Dec. 2018).

Qualcomm Incorporated, "Combined Downlink and Uplink NR Positioning Procedures," 3GPP TSG-RAN WG2 Meeting #104, Spokane, USA, R2-1817899, total 18 pages, 3rd Generation Partnership Project, Valbonne, France (Nov. 12-16, 2018).

"3rd Generation Partnership Project; Technical Specification Group Radio Access Network; NR; Physical layer measurements (Release 15)," 3GPP TS 38.215 V15.4.0, total 15 pages 3rd Generation Partnership Project, Valbonne, France (Dec. 2018).

Qualcomm Incorporated, "On Demand Transmission of PRS for NR," 3GPP TSG-RAN WG2 Meeting #104, Spokane, USA, R2-1817902, total 27 pages, 3rd Generation Partnership Project, Valbonne, France (Nov. 12-16, 2018).

Intel Corporation, "Summary on NR Positioning AI—7.2.10.1.3 DL&UL based Positioning," 3GPP TSG RAN WG1 Ad Hoc Meeting #1901, Taipei, R1-1901343, total 3 pages, 3rd Generation Partnership Project, Valbonne, France (Jan. 21-25, 2019).

* cited by examiner

METHOD AND APPARATUS FOR POSITIONING TERMINAL DEVICE

CROSS-REFERENCE TO RELATED APPLICATIONS

This application is a continuation of International application PCT/CN2020/074861, filed on Feb. 12, 2020, which claims priority to Chinese Patent Application No. 201910117837.7, filed on Feb. 15, 2019. The disclosures of the aforementioned applications are hereby incorporated by reference in their entireties.

TECHNICAL FIELD

This application relates to the communication field, and more specifically, to a method and an apparatus for positioning a terminal device.

BACKGROUND

With continuous development of communication technologies, communication between a terminal and a network node has become a common type of communication between devices. It becomes increasingly important for a network node to position a terminal or for a terminal to request a location service to implement a specific application. In new radio (NR) in 5th generation mobile communication (5th generation mobile networks or 5th generation wireless systems, 5G), beam-based wireless communication is used to improve efficiency of communication on a frequency spectrum with a higher frequency. For positioning in the 5G system, for example, a positioning reference signal (PRS) is also sent by using a beam. Due to use of beams, in NR, positioning measurement may be performed on a same terminal by using a plurality of beams sent by a single base station, or positioning measurement may be performed on a same terminal by using beams sent by different base stations.

A round-trip time (RTT) is a time period (that is, a propagation delay) in which a signal sent by a transmit end is propagated to a receive end plus a time period in which the receive end returns a message to the transmit end. During positioning, the RTT may be used as one of measurement quantities to determine a device location. A location center may determine a location of a terminal device based on the RTT and with reference to another measurement quantity, for example, angle information or RTT measurement results of a plurality of nodes.

In long term evolution (LTE), the RTT is one of ECID (Enhanced Cell ID) measurement quantities, and measurement on only a primary serving cell is supported. A measurement mode is defined by determining a time difference between uplink and downlink frame boundaries. If a neighboring cell participates in RTT measurement, or RTT measurement is implemented by using a plurality of beams, the RTT measurement mode in LTE is not applicable.

SUMMARY

In view of this, this application provides a method and an apparatus for positioning a terminal device. A terminal device sends one or more pieces of first time difference information to a network device, so that the network device learns of a positioning reference signal pair and a time difference that correspond to each other, thereby helping assist a positioning function node in positioning the terminal device.

According to a first aspect, a method for positioning a terminal device is provided, and includes: generating, by a terminal device, a first message, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal; and sending, by the terminal device, the first message to a network device. In this way, the network device obtains the one or more pieces of first time difference information, to learn of a positioning reference signal pair and a time difference that correspond to each other. The network device forwards the one or more pieces of first time difference information to a positioning function node, thereby helping assist the positioning function node in positioning the terminal device.

In an embodiment, the method further includes: receiving, by the terminal device, configuration information from the network device, where the configuration information is used to indicate a configuration resource of the first downlink positioning reference signal that corresponds to the first uplink positioning reference signal and that is in a plurality of downlink positioning reference signals. Herein, the terminal device may determine, based on a configuration of the network device, a downlink positioning reference signal corresponding to the uplink positioning reference signal.

Optionally, when the first message includes a plurality of pieces of first time difference information, in a plurality of first time differences sent by the terminal device to the network device, the $1^{st}$ time difference is an absolute time difference between an uplink positioning reference signal and the $1^{st}$ downlink positioning reference signal, and a subsequent time difference of the $1^{st}$ time difference is a relative time difference between a subsequent downlink positioning reference signal and the $1^{st}$ downlink positioning reference signal. Herein, bits occupied by the absolute time difference reported by the terminal device are greater than bits occupied by the relative time difference reported by the terminal device, and the terminal device does not need to report the absolute time difference each time, thereby helping reduce bit overheads.

Optionally, the first message further includes first indication information, and the first indication information is used to indicate that the terminal device reports the plurality of pieces of first time difference information in incremental mode. Therefore, the terminal device may notify the network device of the reporting manner by using the first indication information, so that the network device calculates a time difference based on the reporting manner.

Optionally, the first message further includes one or more of the following information: a sending time point of one or more uplink positioning reference signals and a receiving time point of one or more downlink positioning reference signals.

Optionally, the receiving time point includes any one of the following:
 (1) an actual receiving time point of the downlink positioning reference signal;
 (2) a start time point and/or an end time point of a time unit determined based on the receiving time point of the downlink positioning reference signal; and (3) a start time point and/or an end time point of a time unit in a cell to which the downlink positioning reference signal belongs.

Therefore, the receiving time point of the downlink positioning reference signal is defined relatively flexibly. This is not specifically limited in the embodiments of this application.

Optionally, the sending time point includes any one of the following:

(1) an actual sending time point of the uplink positioning reference signal;

(2) a start time point and/or an end time point of a time unit determined based on the sending time point of the uplink positioning reference signal; and (3) a start time point and/or an end time point of a time unit in a cell to which the uplink positioning reference signal belongs.

Therefore, the receiving time point of the uplink positioning reference signal is defined relatively flexibly. This is not specifically limited in the embodiments of this application.

In an embodiment, the method further includes: sending, by the terminal device, positioning capability information of the terminal device to one or more network devices, where the positioning capability information includes one or more of the following information: capability information used to indicate whether the terminal device supports cross-frequency round-trip time RTT measurement reporting, information about an uplink frequency and a downlink frequency that are supported by the terminal device, capability information used to indicate whether the terminal device supports multi-antenna panel RTT measurement reporting, capability information used to indicate whether the terminal device supports multi-path RTT measurement reporting, and capability information used to indicate whether the terminal device supports blind detection of a synchronization signal block SSB used for positioning. Herein, the terminal device may report the positioning capability information of the terminal device to the network device in advance, and the network device may forward the positioning capability information to the positioning function node, to assist the positioning function node in positioning the terminal device.

According to a second aspect, a method for positioning a terminal device is provided, and includes: generating, by a network device, a second message, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal; and sending, by the network device, the second message to a positioning function node. Therefore, the network device may also measure a time difference of a positioning reference signal pair, and send one or more second time differences to the positioning function node by using the second message, to help assist the positioning function node in positioning a terminal device.

In an embodiment, a configuration resource of the second downlink positioning reference signal corresponding to the second uplink positioning reference signal is configured by the network device for the terminal device. Therefore, the network device may determine an uplink positioning reference signal and a downlink positioning reference signal that correspond to each other, to measure a corresponding time difference.

In an embodiment, the network device configures a plurality of downlink positioning reference signal resources for the terminal device, and a resource that is of the second downlink positioning reference signal and that corresponds to a resource of the second uplink positioning reference signal is determined by the terminal device in the plurality of downlink positioning reference signal resources. Therefore, the network device may determine, based on measurement performed by the terminal device, an uplink positioning reference signal and a downlink positioning reference signal that correspond to each other, to measure a corresponding time difference.

Optionally, when the second message includes a plurality of pieces of second time difference information, the $1^{st}$ time difference sent by the network device to the positioning function node is an absolute time difference between an uplink positioning reference signal and the $1^{st}$ downlink positioning reference signal, and a subsequent time difference of the $1^{st}$ time difference is a relative time difference between a subsequent downlink positioning reference signal and the $1^{st}$ downlink positioning reference signal. Herein, bits occupied by the absolute time difference sent by the network device to the positioning function node is greater than bits occupied by the relative time difference sent by the network device, and the network device does not need to send the absolute time difference each time, thereby helping reduce bit overheads.

Optionally, the second message further includes second indication information, and the second indication information is used to indicate that the network device sends the plurality of pieces of second time difference information in incremental mode. Therefore, the network device may notify the positioning function node of the reporting manner by using the second indication information, so that the positioning function node deduces a time difference based on the reporting manner.

In an embodiment, the method further includes: receiving, by the network device, a first message from the terminal device, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal; and sending, by the network device, the first message to the positioning function node. Herein, after receiving the first message reported by the terminal device, the network device may send the first message to the positioning function node, so that the positioning function node determines, based on the first message and the second message, an RTT corresponding to each reference signal, to assist the positioning function node in positioning the terminal device.

In an embodiment, the network device receives the first message sent by the terminal device, and the network device calculates the RTT of each positioning reference signal pair based on the one or more pieces of first time difference information in the first message and the one or more pieces of second time difference information determined by the network device, and sends the RTT of each reference signal pair to the positioning function node. In other words, the network device may determine, jointly by using the second time difference information determined by the network device and the first time difference information reported by the terminal device, the RIT corresponding to each positioning reference signal pair, and then send the RTT of each reference signal pair to the positioning function node, to assist the positioning function node in positioning the terminal device.

In an embodiment, the method further includes: receiving, by the network device, request information from the positioning function node, where the request information is used to obtain measurement information required for positioning the terminal device. Herein, the network device may send the first message and/or the second message to the positioning function node based on a request of the positioning function node.

Optionally, the request information includes one or more of the following information: identification information of the terminal device, positioning capability information of the terminal device, information about space in which the terminal device is located, positioning manner information, positioning reporting information, positioning configuration information, delay information of the terminal device, angle information of the terminal device, and power information of the terminal device.

According to a third aspect, a method for positioning a terminal device is provided, and includes: determining, by a positioning function node, a network device participating in positioning; sending, by the positioning function node, request information to the network device, where the request information is used to obtain measurement information required for positioning a terminal device; and receiving, by the positioning function node, a second message from the network device, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal. Therefore, the positioning function node may obtain the one or more pieces of second time difference information by obtaining the second message sent by the network device, to position the terminal device based on the one or more pieces of second time difference information.

In an embodiment, the method further includes: receiving, by the positioning function node, a first message from the network device, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal. Therefore, the positioning function node may obtain the one or more pieces of first time difference information by obtaining the first message that is of the terminal device and that is sent by the network device, to position the terminal device based on the one or more pieces of first time difference information.

Optionally, the request information includes one or more of the following information: identification information of the terminal device, positioning capability information of the terminal device, information about space in which the terminal device is located, positioning manner information, positioning reporting information, positioning configuration information, delay information of the terminal device, angle information of the terminal device, and power information of the terminal device.

It should be understood that the positioning function node may obtain the first message, and position the terminal device based on the one or more pieces of first time difference information in the first message; may obtain the second message from the network device, and position the terminal device based on the one or more pieces of second time information in the second message; or may obtain both the first message and the second message, and position the terminal device jointly based on the one or more pieces of first time difference information in the first message and the one or more pieces of second time information in the second message. This is not limited in the embodiments of this application.

According to a fourth aspect, a communication apparatus is provided. The communication apparatus includes a module configured to perform the method according to any one of the embodiments of the first aspect.

According to a fifth aspect, a communication apparatus is provided. The communication apparatus includes a module configured to perform the method according to any one of the embodiments of the second aspect.

According to a sixth aspect, a communication apparatus is provided. The communication apparatus includes a module configured to perform the method according to any one of the embodiments of the third aspect.

According to a seventh aspect, a communication apparatus is provided. The communication apparatus may be the terminal device in the foregoing method designs, or may be a chip disposed in the terminal device. The communication apparatus includes a processor that is coupled to a memory, and the processor may be configured to execute instructions in the memory, to implement the method performed by the terminal device in any one of the embodiments of the first aspect. Optionally, the communication apparatus further includes the memory. Optionally, the communication apparatus further includes a communication interface, and the processor is coupled to the communication interface.

When the communication apparatus is the terminal device, the communication interface may be a transceiver or an input/output interface.

When the communication apparatus is the chip disposed in the terminal device, the communication interface may be an input/output interface.

Optionally, the transceiver may be a transceiver circuit. Optionally, the input/output interface may be an input/output circuit.

According to an eighth aspect, a communication apparatus is provided. The communication apparatus may be the network device in the foregoing method designs, or may be a chip disposed in the network device. The communication apparatus includes a processor that is coupled to a memory, and the processor may be configured to execute instructions in the memory, to implement the method performed by the network device in any one of the embodiments of the second aspect. Optionally, the communication apparatus further includes the memory. Optionally, the communication apparatus further includes a communication interface, and the processor is coupled to the communication interface.

When the communication apparatus is the network device, the communication interface may be a transceiver or an input/output interface.

When the communication apparatus is the chip disposed in the network device, the communication interface may be an input/output interface.

Optionally, the transceiver may be a transceiver circuit. Optionally, the input/output interface may be an input/output circuit.

According to a ninth aspect, a communication apparatus is provided. The communication apparatus may be the positioning function node in the foregoing method designs, or may be a chip disposed in the positioning function node. The communication apparatus includes a processor that is coupled to a memory, and the processor may be configured to execute instructions in the memory, to implement the method performed by the positioning function node in any one of the third aspect and the possible implementations of the third aspect. Optionally, the communication apparatus further includes the memory. Optionally, the communication apparatus further includes a communication interface, and the processor is coupled to the communication interface.

When the communication apparatus is the positioning function node, the communication interface may be a transceiver or an input/output interface.

When the communication apparatus is the chip disposed in the positioning function node, the communication interface may be an input/output interface.

Optionally, the transceiver may be a transceiver circuit. Optionally, the input/output interface may be an input/output circuit.

According to a tenth aspect, a program is provided. When executed by a processor, the program is used to perform the method according to any one of the first aspect, the second aspect, the third aspect, and the embodiments of the first aspect, the second aspect, or the third aspect.

According to an eleventh aspect, a program product is provided. The program product includes program code. When the program code is run by a communication unit and a processing unit, or a transceiver and a processor of a communication apparatus (for example, a terminal device), the communication device performs the method according to any one of the embodiments of the first aspect.

According to a twelfth aspect, a program product is provided. The program product includes program code. When the program code is run by a communication unit and a processing unit, or a transceiver and a processor of a communication apparatus (for example, a network device), the communication device performs the method according to any one of the embodiments of the second aspect.

According to a thirteenth aspect, a program product is provided. The program product includes program code. When the program code is run by a communication unit and a processing unit, or a transceiver and a processor of a communication apparatus (for example, a positioning function node), the communication device performs the method according to any one of the embodiments of the third aspect.

According to a fourteenth aspect, a computer-readable storage medium is provided. The computer-readable storage medium stores a program, and the program enables a communication apparatus (for example, a terminal device) to perform the method according to any one of the embodiments of the first aspect.

According to a fifteenth aspect, a computer-readable storage medium is provided. The computer-readable storage medium stores a program, and the program enables a communication apparatus (for example, a network device) to perform the method according to any one of the embodiments of the second aspect.

According to a sixteenth aspect, a computer-readable storage medium is provided. The computer-readable storage medium stores a program, and the program enables a communication apparatus (for example, a positioning function node) to perform the method according to any one of the embodiments of the third aspect.

DESCRIPTION OF EMBODIMENTS

Figure 1:
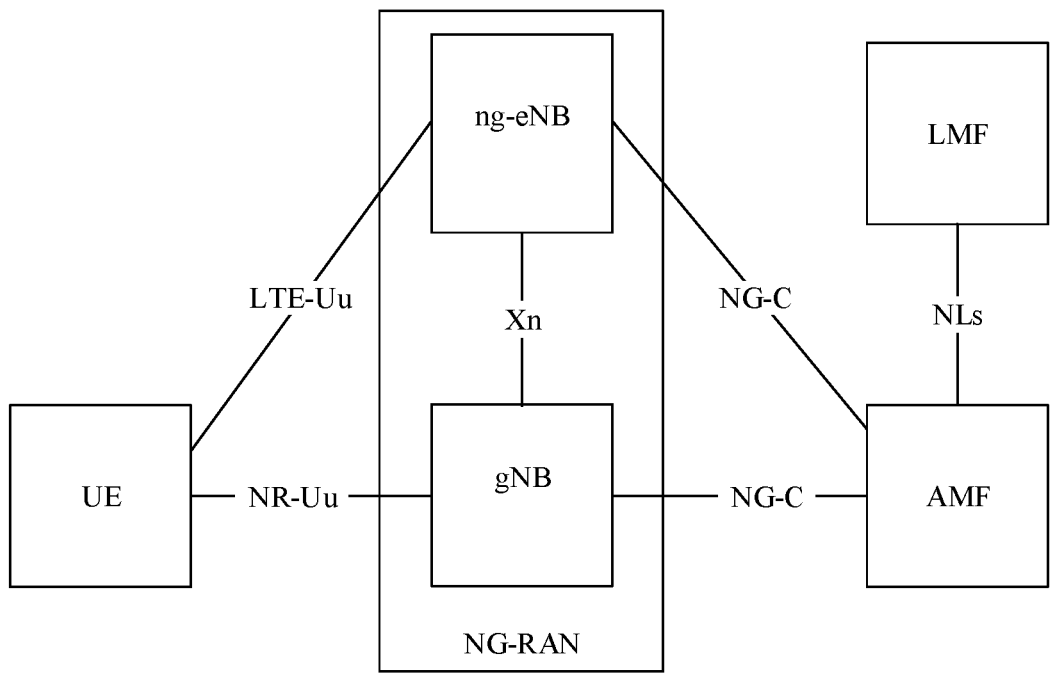
FIG. 1 is a schematic diagram of an architecture of a positioning system for positioning a terminal device to which an embodiment of this application is applicable.

The following describes technical solutions in this application with reference to the accompanying drawings.

In the embodiments of this application, "a plurality of" may be understood as "at least two"; and "a plurality of items" may be understood as "at least two items".

The technical solutions in the embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, or an NR system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

A network device in the embodiments of this application may be a device configured to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application. Alternatively, the network device may be a serving node (or referred to as a positioning function node or a location center) used for positioning, for example, a location management function (LMF), a location management component (LMC), or a location measurement unit (LMU).

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, contacts, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 is a schematic diagram of an architecture of a positioning system for positioning a terminal device to which an embodiment of this application is applicable. As shown in FIG. 1, in the positioning system, UE is connected to a radio access network through an LTE-Uu interface and/or an NR-Uu interface via a next-generation eNodeB (ng-eNB) and a gNB respectively. The radio access network is connected to a core network through an NG-C interface via an access and mobility management function (AMF). A next-generation radio access network (NG-RAN) includes one or more ng-eNBs. The NG-RAN may also include one or more gNBs. The NG-RAN may alternatively include one or more ng-eNBs and gNBs. The ng-eNB is an LTE base station that accesses a 5G core network, and the gNB is a 5G base station that accesses the 5G core network. The core network includes functions such as the AMF and a location management function (LMF). The AMF is configured to implement functions such as access management, and the LMF is configured to implement functions such as positioning. The AMF and the LMF are connected through an NLs interface. The LMF is an apparatus or a component deployed in the core network to provide a positioning function for the UE.

Figure 2:
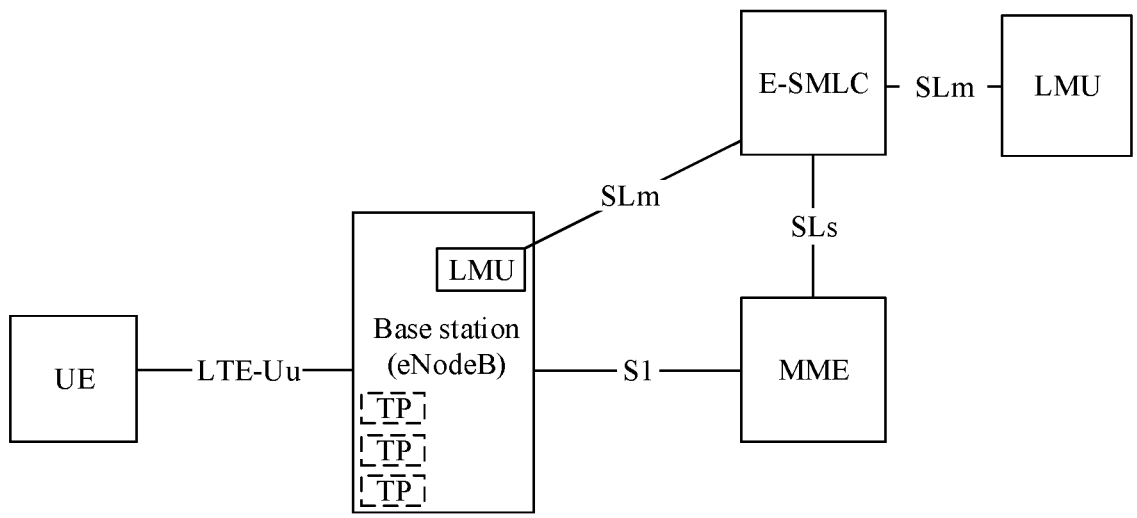
FIG. 2 is a schematic diagram of an architecture of another positioning system for positioning a terminal device to which an embodiment of this application is applicable.

FIG. 2 is a schematic diagram of an architecture of another positioning system for positioning a terminal device to which an embodiment of this application is applicable. A difference between the architectures of the positioning system in FIG. 1 and the positioning system in FIG. 2 lies in that an apparatus or a component (for example, the LMF) of the location management function in FIG. 1 is deployed in the core network, some apparatuses or components (for example, a location management component (LMC) or a location measurement unit (LMU)) of a positioning management function in FIG. 2 may be deployed in a base station, or may be separated from the base station. As shown in FIG. 2, a gNB includes an LMU. The LMU is a functional component of an LMF, and may be integrated into the gNB or may be deployed independently. The LMU is connected to an evolved serving mobile location center (E-SMLC) through an SLm interface.

In the embodiments of this application, a positioning function node (for example, the E-SMLC or the LMF) collects measurement information and location information that are reported by a base station and/or UE, to determine a location of the UE. The UE exchanges the information with the positioning function node by using an LPP protocol or an NR PP protocol, and the base station exchanges the information with the positioning function node by using an LPPa protocol or an NRPPa protocol.

It should be understood that the positioning system in FIG. 1 or FIG. 2 may include one or more gNBs and one or more UEs. A single gNB may transmit data or control signaling to one or more UEs. A plurality of gNBs may simultaneously transmit data or control signaling to a single UE.

It should be further understood that the devices or the function nodes included in the positioning system in FIG. 1 or FIG. 2 are merely described as an example, and do not constitute a limitation on the embodiments of this application. In practice, the positioning system in FIG. 1 or FIG. 2 may further include another network element, device or function node that has an interaction relationship with the device or function node shown in the figure. This is not specifically limited herein.

For ease of understanding, the following briefly describes some terms or concepts in the embodiments of this application.

Quasi-co-location (QCL): QCL may also be referred to as quasi-colocation. A quasi-colocation relationship is used to indicate that a plurality of resources have one or more same or similar communication features. For the plurality of resources that have the quasi-colocation relationship, a same or similar communication configuration may be used. For example, if two antenna ports have the quasi-colocation relationship, large-scale information of a channel over which a symbol on one port is conveyed can be inferred from large-scale information of a channel over which a symbol on the other port is conveyed. For example, that an antenna port of a synchronization signal/physical broadcast channel block (synchronization signal/physical broadcast channel block, SS/PBCH block) and an antenna port of a physical downlink control channel (PDCCH) demodulation reference signal (DMRS) are QCLed on a spatial receive parameter means that a spatial receive parameter, to be specific, a receive beam direction, used when the PDCCH DMRS is received can be inferred from a spatial receive parameter, to be specific, a receive beam direction, used when UE receives the SS/PBCH block. In other words, the UE may receive the PDCCH DMRS based on an optimal receive beam trained by the SS/PBCH block. The SS/PBCH block may also be referred to as a synchronization signal block (SSB).

That two reference signals are QCLed on a large-scale parameter means that any antenna port on the first reference signal and any antenna port on the second reference signal are QCLed on the large-scale parameter.

Quasi-colocation assumption (QCL assumption): QCL assumption is an assumption of whether two ports have a QCL relationship. A configuration and an indication of the quasi-colocation assumption may be used to help a receive end to receive and demodulate a signal. For example, if the receive end can determine that a port A and a port B have the QCL relationship, the receive end can use a large-scale parameter of a signal measured on the port A for signal measurement and demodulation on the port B. QCL types are as follows: QCL-Type A: {Doppler shift, Doppler spread, average delay, delay spread}; QCL-Type B: {Doppler shift, Doppler spread}; QCL-Type C: {average delay, Doppler shift}; and QCL-Type D: {spatial receive parameter}, where QCL-Type D indicates spatial QCL or spatial quasi-colocation.

Beam (beam): A beam is a type of communication resource. The beam may be a wide beam, a narrow beam, or another type of beam. A technology for forming a beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams with a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It can be understood that the one or more antenna ports forming the beam may alternatively be considered as one antenna port set. In a protocol, the beam can also be embodied as a spatial filter.

Beam quality: Beam quality may be measured by using a measurement indicator such as reference signal received power (RSRP), a block error rate (BLER), reference signal received quality (RSRQ), a received signal strength indicator (RSSI), a signal to interference plus noise ratio (SINR), a signal quality indicator (CQI), or correlation. It should be understood that the measurement indicator for the beam quality is not limited in the embodiments of this application.

Antenna panel: A signal in wireless communication needs to be received and sent through an antenna, and a plurality of antenna elements (antenna element) may be integrated on one panel. One radio frequency chain may drive one or more antenna elements. In the embodiments of this application, the terminal device may include a plurality of antenna panels, and each antenna panel includes one or more beams. The network device may also include a plurality of antenna panels, and each antenna panel includes one or more beams. The antenna panel may alternatively be represented as an antenna array or an antenna subarray. One antenna panel may include one or more antenna arrays/subarrays. One antenna panel may be controlled by one or more oscillators. The radio frequency chain may also be referred to as a receive channel and/or a transmit channel, a receiver branch, or the like. One antenna panel may be driven by one radio frequency chain, or may be driven by a plurality of radio frequency chains. Therefore, the antenna panel in the embodiments of this application may alternatively be replaced with a radio frequency chain, a plurality of radio frequency chains that drive one antenna panel, or one or more radio frequency chains that are controlled by one oscillator.

RTT: An RTT is a time period in which a signal sent by a transmit end is propagated to a receive end plus a time period in which the receive end returns the signal to the transmit end. In an ideal situation, when processing delays at the transmit end and the receive end are not considered, the RTT is equal to twice a propagation delay between the transmit end and the receive end. The RTT may be used to determine a distance D between the transmit end and the receive end, that is, $D=RTT/2*c$, where c is the speed of light. During positioning, the RTT may be used as a measurement quantity used to determine a location of the terminal device.

In LTE, horizontal positioning precision is less than 50 m, and vertical positioning precision can be used to identify a storey. A positioning requirement in the 5G system or new radio NR system includes a requirement for a business scenario. For the requirement for the business scenario, outdoor horizontal positioning precision needs to be less than 10 m, outdoor vertical positioning precision needs to be less than 3 m (to be determined), indoor horizontal positioning precision needs to be less than 3 m, and indoor vertical positioning precision needs to be less than 3 m (to be determined). Compared with the monotonous requirement in LTE, in 5G, not only a plurality of levels of requirements are supported, the requirement for the business scenario is also more stringent than that in LTE. Therefore, an RTT-based positioning method in 5G needs to be further optimized.

In NR, in RTT-based positioning, a plurality of reference signals of a plurality of network devices or a plurality of reference signals of one network device may be measured. In NR, one network device may include a plurality of transmission points (transmission point, TP), and may send positioning reference signals to a same terminal device by using a plurality of transmission points. Alternatively, a plurality of network devices, for example, one serving base station and a plurality of neighboring base stations, measure a reference signal sent by a terminal device, to obtain RTT measurement. Because transmission and reception of reference signals of a plurality of TPs cause an association problem in RTT calculation, a pair of reference signals whose time difference is to be used in the RTT calculation needs to be specified. Otherwise, a calculation error is caused, and a measurement error is caused.

For example, when the terminal device receives a plurality of downlink positioning reference signals, to perform RTT measurement, the terminal device also needs to send a positioning reference signal in an uplink direction, so that the network device measures the uplink positioning reference signal sent by the terminal. The uplink positioning reference signal sent by the terminal device may be received by a plurality of network devices. If the terminal device does not specify a correspondence between a downlink positioning reference signal and an uplink positioning reference signal in a measurement report, a network device does not know a downlink positioning reference signal and an uplink positioning reference signal between which a time difference measured by the terminal is obtained, causing confusion in RTT calculation.

Figure 3:
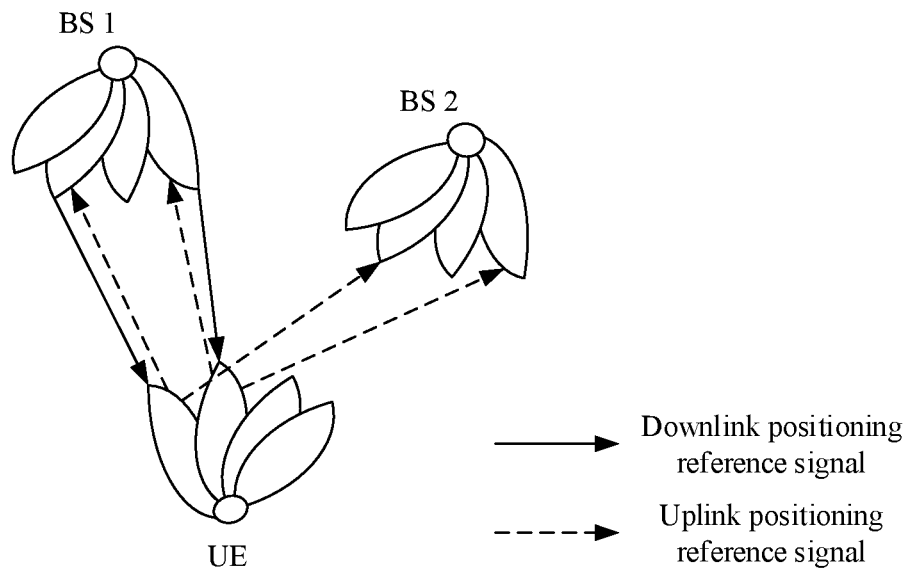
FIG. 3 is an example diagram of sending a positioning reference signal in the current technology.

An example in FIG. 3 is used herein to describe the foregoing problem. As shown in FIG. 3, both UE and BSs (including a BS 1 and a BS 2) have a multi-beam transceiver capability. In RTT measurement, the UE may receive a plurality of downlink positioning reference signals from the BS 1, or may receive a plurality of downlink positioning reference signals from a plurality of BSs (for example, the BS 1 and the BS 2). When performing RTT measurement, the UE needs to send an uplink positioning reference signal in an uplink direction. The BS 1 is used as an example. If the UE does not explicitly notify the BS 1 of a downlink positioning reference signal corresponding to an uplink positioning reference signal, after receiving a plurality of uplink positioning reference signals (where the plurality of uplink positioning reference signals may include an uplink positioning reference signal corresponding to a downlink positioning reference signal of the BS 2), the BS 1 cannot learn of a downlink positioning reference signal corresponding to the uplink positioning reference signal. Therefore, a downlink positioning reference signal and an uplink positioning reference signal that correspond to a time difference measured by the UE cannot be learned of.

It should be understood that the BS 1 and the BS 2 are merely used as examples for description in FIG. 3. Actually, more BSs may be included. This is not limited in the embodiments of this application.

To resolve the foregoing problem, this application provides a method for positioning a terminal device. One or more pieces of first time difference information are sent to a network device, where the first time difference information includes a first time difference and information about a first positioning reference signal pair corresponding to the first time difference, so that a positioning function node obtains a time difference of a current cell or a neighboring cell. This helps assist the positioning function node in positioning a terminal device. Further, the network device may send the one or more pieces of first time difference information measured by the terminal device to the positioning function node.

Unified descriptions are provided herein. If the positioning function component is deployed in the network device, that the terminal device may report the one or more pieces of first time information to the network device may be understood as directly reporting the one or more pieces of first time information to the positioning function node. If the positioning function node is independently deployed (for example, the LMF in the positioning system shown in FIG. 1 is deployed in the core network), after the terminal device reports the one or more pieces of first time information to the network device, the network device may send the one or more pieces of first time information to the positioning function node.

Figure 4:
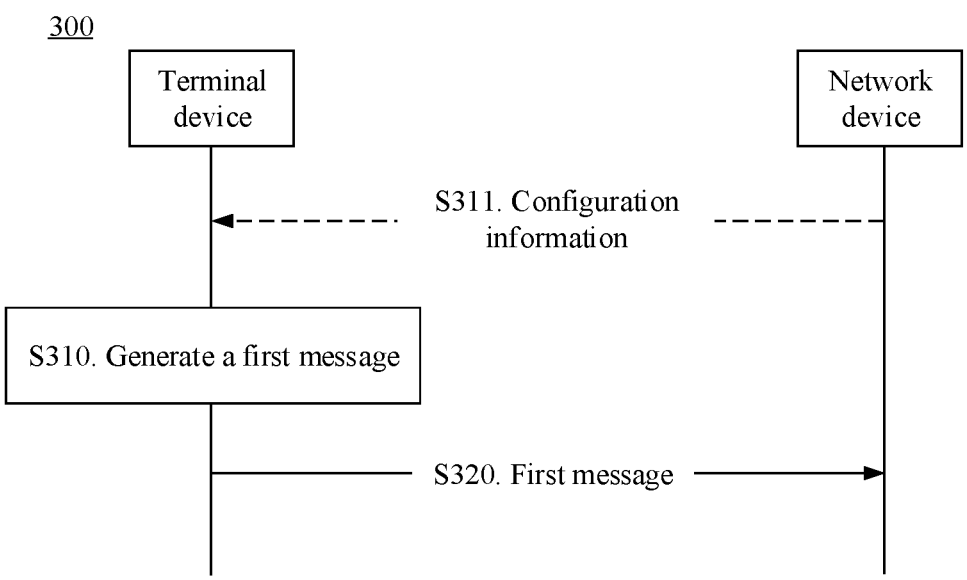
FIG. 4 is a schematic interaction diagram of a method for positioning a terminal device according to an embodiment of this application.

FIG. 4 is a schematic flowchart of a method 300 for positioning a terminal device according to an embodiment of this application. As shown in FIG. 4, the method 300 includes the following steps.

S310. A terminal device generates a first message, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal.

The information about the first positioning reference signal pair may be related information of the first uplink positioning reference signal and the first downlink positioning reference signal that have the association relationship, for example, an ID corresponding to the first uplink positioning reference signal and an ID corresponding to the first downlink positioning reference signal, IDs of cells to which the positioning reference signals belong, or beam information corresponding to the positioning reference signals.

The sending time point of the uplink positioning reference signal may be any one of the following:
  (1) an actual sending time point of the uplink positioning reference signal;
  (2) a start time point and/or an end time point of a time unit determined based on the sending time point of the uplink positioning reference signal; and
  (3) a start time point and/or an end time point of a time unit in a cell to which the uplink positioning reference signal belongs (for example, a start time point of an $i^{th}$ uplink subframe in a cell to which an uplink positioning reference signal D belongs).

The receiving time point of the downlink positioning reference signal may be any one of the following:
  (1) an actual receiving time point of the downlink positioning reference signal (for example, a start point of the first symbol of an aperiodic downlink positioning reference signal, a start point of a burst signal set (burst or occasion) (where the burst signal set is a set including one or more subframes of one or more downlink positioning reference signals), or a start point of a subframe 0 corresponding to a downlink positioning reference signal);

(2) a start time point and/or an end time point of a time unit determined based on the receiving time point of the downlink positioning reference signal (for example, a start time point of a $j^{th}$ downlink subframe determined based on a downlink positioning reference signal Y, where j=0, 1, 2, . . . ); and (3) a start time point and/or an end time point of a time unit in a cell to which the downlink positioning reference signal belongs (for example, a start time point of a $j^{th}$ downlink subframe in a cell to which a downlink positioning reference signal C belongs).

For the receiving time point of the downlink positioning reference signal, the terminal device may select, from a plurality of paths of the downlink positioning reference signal, a time of arrival on the first path as a time of arrival or the receiving time point of the cell or the downlink positioning reference signal, or the terminal device needs to select, from a plurality of beams by using a receive beam sweeping method, a beam on which the downlink positioning reference signal is first received, measure the downlink positioning reference signal, and use a time point at which the downlink positioning reference signal is received on the beam as the receiving time point of the downlink positioning reference signal.

The first time difference may be understood as a time difference (or an absolute value of the time difference) between the receiving time point of the first downlink positioning reference signal and the sending time point of the first uplink positioning reference signal, or a time difference (or an absolute value of the time difference) between the sending time point of the first uplink positioning reference signal and the receiving time point of the first downlink positioning reference signal.

It should be understood that the first time difference may be a time difference between any one of the three cases of the sending time point of the uplink positioning reference signal and any one of the three cases of the receiving time point of the downlink positioning reference signal.

The start time point and/or the end time point of the time unit in the foregoing six cases (the three cases of the sending time point of the uplink positioning reference signal and the three cases of the receiving time point of the downlink positioning reference signal) may be understood as boundaries of the time unit. The boundaries of the time unit may be determined in the following manners:

(1) A value of a subframe index i of an uplink subframe corresponding to the uplink positioning reference signal that participates in time difference calculation is the same as a value of a subframe index j of a downlink subframe corresponding to the downlink positioning reference signal that participates in the time difference calculation, that is, i=j.

(2) A value of a subframe index i of an uplink subframe corresponding to the uplink positioning reference signal that participates in time difference calculation may be different from a value corresponding to a subframe index j of a downlink subframe corresponding to the downlink positioning reference signal that participates in the time difference calculation. Specifically, values of i and j may be determined based on the absolute value of the time difference. For example, the value of i ranges from 1 to 1024, and the value of j ranges from 1 to 1024. In this case, there may be 1024*1024 possible time differences calculated by using the $i^{th}$ uplink subframe and the $j^{th}$ downlink subframe. Herein, i and j corresponding to a minimum absolute value in the 1024*1024 values may be selected as the value of the uplink subframe i and the value of the downlink subframe j, respectively. Correspondingly, the reported first time difference may be a minimum value of an absolute value of a time difference between subframe start points that are determined based on the uplink positioning reference signal and the downlink positioning reference signal.

For example, the first time difference may be defined as a difference between a time point at which the terminal device receives a downlink subframe j (or a start point of the subframe j, a start point of the subframe j on the first path, a start point of the subframe j on a path through which a signal is first arrived on a plurality of receive beams, or the like) and a time point at which the terminal device sends an uplink subframe i (or a start point of the subframe i) that is closest to the downlink subframe j in terms of time. It should be understood that the uplink and the downlink related to the first time difference may be replaced with each other. The first time difference may alternatively be a time difference between sending time points of uplink positioning reference signals, or a time difference between receiving time points of downlink positioning reference signals. Details are not described herein again.

Optionally, the first time difference may be replaced with a time difference between a sending time point of an uplink positioning reference signal and a sending time point of an uplink positioning reference signal, or may be replaced with a time difference between a receiving time point of a downlink positioning reference signal and a receiving time point of a downlink positioning reference signal.

It should be understood that the foregoing listed various possible forms of the first time difference may coexist in the first message, or may exist independently. This is not specifically limited. For example, the first message may include one or more of the following information: a time difference (or an absolute value of the time difference) between the receiving time point of the first downlink positioning reference signal and the sending time point of the first uplink positioning reference signal, a time difference (or an absolute value of the time difference) between the sending time point of the first uplink positioning reference signal and the receiving time point of the first downlink positioning reference signal, a time difference between a sending time point of an uplink positioning reference signal and a sending time point of an uplink positioning reference signal, a time difference between a receiving time point of a downlink positioning reference signal and a receiving time point of a downlink positioning reference signal, a sending time point of one or more uplink positioning reference signals, a receiving time point of one or more downlink positioning reference signals, an ID corresponding to the first uplink positioning reference signal and an ID corresponding to the first downlink positioning reference signal, IDs of cells to which the positioning reference signals belong, beam information corresponding to the positioning reference signals, and the like.

Unified descriptions are provided herein. The time unit in the embodiments of this application may be an orthogonal frequency division multiplexing (OFDM) symbol, a subframe, a frame, a slot, a mini-slot, or the like. Further, because uplink and downlink positioning reference signals may be received and sent on a plurality of symbols with different subcarrier spacings, a timing point for the time difference may be set as a start point or an end point of a time unit such as the first uplink frame/OFDM symbol/subframe. It is clear that, when a receiving time point of a downlink positioning reference signal and a sending time point of an uplink positioning reference signal need to be used jointly to determine a reporting quantity (for example, to make a difference), a plurality of receiving time points/sending time points need to be calculated based on a same time reference system. A specific time coordinate system in which timing is performed is not limited in the embodiments of this application.

Unified descriptions are provided herein. Optionally, concepts of time (for example, the sending time point of the uplink positioning reference signal or the receiving time point of the downlink positioning reference signal) that appear in the embodiments of this application may be absolute time (for example, in a unit of second), and may be obtained, for example, by using a global time coordinate system (for example, by using a GPS or network information); may be relative time, and may be in a unit of a symbol, a slot, a mini-slot, a subframe, a frame, or the like of a cell (for example, a PCell, or a serving cell with a smallest cell ID), or in a unit of Tc (1/(480000*4096)); or may be absolute time at a start point of a subframe 0 corresponding to receiving and sending of a signal by the terminal device. This is not limited in the embodiments of this application.

Unified descriptions are provided herein. A positioning reference signal (including the uplink positioning reference signal and the downlink positioning reference signal) in the embodiments of this application is a reference signal for positioning a terminal device. It should be understood that, in the embodiments of this application, "reference signals for positioning the terminal device" are collectively denoted as the "positioning reference signal". However, it cannot be understood as that the "positioning reference signal" includes only a reference signal (PRS) dedicated for positioning. Details are not described below. Optionally, the reference signal for positioning the terminal device includes but is not limited to a positioning reference signal PRS, a demodulation reference signal (DMRS), a tracking reference signal (TRS), and a channel state information reference signal (CSI-RS).

It should be understood that a sequence of a step of sending an uplink positioning reference signal and a step of receiving a downlink positioning reference signal is not specifically limited in the embodiments of this application, and the two steps may be performed alternately.

Optionally, an association relationship between the uplink positioning reference signal and the downlink positioning reference signal may be configured by a network device for the terminal device, may be determined by the terminal device, or may be predefined in a protocol. This is not limited in the embodiments of this application.

Manner 1: The network device configures an association relationship between an uplink positioning reference signal and a downlink positioning reference signal. Optionally, before S310, the method further includes the following step.

S311. The network device sends configuration information to the terminal device. Correspondingly, the terminal device receives the configuration information from the network device, where the configuration information is used to indicate information about the first downlink positioning reference signal that corresponds to the first uplink positioning reference signal and that is in a plurality of downlink positioning reference signals, for example, a configuration resource of the positioning reference signal. The terminal device may determine the association relationship between the uplink positioning reference signal and the downlink positioning reference signal based on the configuration information sent by the network device. In other words, the network device may directly configure, for the terminal device, an association relationship between a specific downlink positioning reference signal and a specific uplink positioning reference signal.

For example, the network device indicates spatial relation information (spatial relation information) of an uplink positioning reference signal by using a downlink positioning reference signal, and allocates a dedicated uplink resource to the downlink positioning reference signal. The downlink positioning reference signal that has an association relationship with the uplink positioning reference signal may be a reference signal of a serving cell, or may be a reference signal of a neighboring cell. This is not limited. The associated downlink positioning reference signal may be used to determine a beam direction, a path loss, a timing anchor, and the like. Optionally, downlink positioning reference signals used to determine a beam direction, a path loss, and a timing anchor may be different.

Optionally, the network device may configure, for the terminal device by using RRC signaling or positioning protocol signaling, a downlink positioning reference signal that has an association relationship with an uplink positioning reference signal. After obtaining a positioning reference signal pair that has an association relationship, the terminal device may determine a time difference corresponding to the positioning reference signal pair. The positioning reference signal pair is a pair of an uplink positioning reference signal and a downlink positioning reference signal that have the association relationship.

Optionally, the configuration information may further include configuration information of a downlink positioning reference signal, configuration information of an uplink positioning reference signal, a reporting configuration, and the like.

The configuration information of the downlink positioning reference signal may be used to indicate a configuration of the downlink positioning reference signal that needs to be measured when the terminal device performs RTT measurement. Optionally, the configuration information of the downlink positioning reference signal includes one or more of the following information: a frequency, a sending time-frequency resource, a periodicity, beam information, power information, sequence information, timing information, and the like of the downlink positioning reference signal.

The configuration information of the uplink positioning reference signal includes one or more of the following information: a sending frequency, a time-frequency resource, a periodicity, beam information, power information, sequence information, timing information, and the like of the uplink positioning reference signal. The beam information, the power information, and the timing information of the uplink positioning reference signal may be indicated in an association manner by using the downlink positioning reference signal that has the association relationship with the uplink positioning reference signal.

The reporting configuration refers to configurations such as a reporting mode (for example, a single-site reporting mode or a multi-site reporting mode) and a reporting manner (for example, whether differential reporting is used) of the terminal device.

Optionally, the configuration information sent by the network device to the terminal device may further include one or more of the following information: measurement gap duration, whether joint measurement on QCLed reference signals is allowed and information about a related joint measurement resource, whether panel RTT reporting is required and information about a maximum quantity of panels to be reported, whether a multi-path (multi-path) RTT is required and a maximum quantity of multi-paths that can be reported, a quantity of uplink and/or downlink cells that need to be reported or are allowed to be reported, a reporting mode (a multi-site reporting mode or a single-site reporting mode), whether differential RTT reporting is used, whether additional reporting of a blindly detected SSB is allowed and a related condition, and the like.

Optionally, the terminal device may perform RTT measurement by using a random access mechanism or another similar mechanism. The network device configures a series of downlink positioning reference signal resources for the terminal device, and each downlink positioning reference signal resource is associated with a corresponding uplink positioning reference signal resource. The terminal device selects, based on a measurement result (for example, signal strength, RSRP, RSRQ, or an SINR) of a downlink positioning reference signal resource, a corresponding uplink positioning reference signal resource for sending, and subsequently reports the selected downlink positioning reference signal resource and the corresponding uplink positioning reference signal resource to the network device.

Manner 2: The terminal device may alternatively determine an association relationship between an uplink positioning reference signal and a downlink positioning reference signal.

The terminal device may independently associate the uplink positioning reference signal with the downlink positioning reference signal. For example, an uplink positioning reference signal and a downlink positioning reference signal related to a time difference reported by the terminal device may be received and sent by using a same beam. If the network device may configure a plurality of downlink positioning reference signal resources for the terminal device, the terminal device determines, in the plurality of downlink positioning reference signal resources, a downlink positioning reference signal resource corresponding to an uplink positioning reference signal resource. The plurality of downlink positioning reference signal resources may be downlink positioning reference signal resources that are of a plurality of cells and that are specified by the network device or downlink positioning reference signal resources of a serving cell. Herein, the terminal device may detect a downlink positioning reference signal, to find a surrounding downlink positioning reference signal.

For example, the network device may send one or more downlink positioning reference signals to the terminal device. The terminal device may measure the one or more downlink positioning reference signals, to obtain a measurement result. For example, the measurement result may include information such as a time of arrival or a receiving time point (or a time difference between the downlink positioning reference signal and a positioning reference signal) of the downlink positioning reference signal, signal power, a receiving beam, arrival time confidence, and a specific type of the downlink positioning reference signal. This is not limited in the embodiments of this application.

Optionally, the terminal device may determine, in the plurality of downlink positioning reference signals based on factors such as signal quality, beam quality, an arrival sequence of the reference signals, and whether the reference signals are from a same cell, a downlink positioning reference signal that has an association relationship with an uplink positioning reference signal. For example, the terminal device may determine the association relationship between the uplink positioning reference signal and the downlink positioning reference signal by using cell IDs.

The terminal device may perform joint measurement on a plurality of downlink positioning reference signals that meet a condition, to obtain a joint measurement result. The condition may be any one of the following conditions: (1) The reference signals belong to one cell, for example, have a same PCI or cell ID, or are configured in a set of resources that belong to one cell. (2) The reference signals have a quasi-co-location relationship, including but not limited to one or more of QCL type A/B/C/D. (3) The network side notifies, by using a configuration, the terminal device of downlink reference signals that can be jointly measured, or a protocol specifies downlink reference signals that can be jointly measured by the terminal device, for example, a resource set {RS #1, RS #2}.

When the terminal device supports multi-antenna panel measurement, for a same downlink positioning reference signal, the terminal device may obtain a plurality of measurement results by using different antenna panels, and each measurement result corresponds to one antenna panel. For a same downlink positioning reference signal in a same cell, if the terminal device reports measurement results (including time differences) that correspond to a plurality of antenna panels and that are obtained when the downlink positioning reference signal is received by using the plurality of antenna panels, a positioning function node can determine information such as an antenna orientation of the terminal device by using the antenna panels, so that the positioning function node is assisted in positioning the terminal device. For a same downlink positioning reference signal, the terminal device may measure delays on different paths in channel propagation, and obtain measurement results of a plurality of paths. For a same downlink positioning reference signal in a same cell, if the terminal device reports measurement results (including time differences) that are of the plurality of paths and that correspond to the downlink positioning reference signal, the positioning function node can perform determining by using information such as line-of-sight (line of sight, LOS) transmission or non-line-of-sight (non line of sight, NLOS) transmission, so that the positioning function node is assisted in positioning the terminal device.

For an uplink positioning reference signal, the terminal device may determine one or more of the following information corresponding to the uplink positioning reference signal: a resource identifier, a sending time point, a sending beam or spatial filtering information, uplink transmit power, and the like corresponding to the uplink positioning reference signal.

S320. The terminal device sends the first message to the network device. Correspondingly, the network device receives the first message.

Unified descriptions are provided herein. The network device in this embodiment of this application may be understood as a base station (corresponding to a case in which the positioning function node is independently deployed). After receiving the first message, the base station may forward the first message to the positioning function node. Alternatively, the network device may be understood as a positioning function node (for example, an LMU\LMF\LMC). In this case, the terminal device directly sends the first message to the positioning function node. Correspondingly, if the network device is a base station, the first time difference is a time difference between a downlink positioning reference signal sent by the base station and an uplink positioning reference signal reported by the terminal device. If the network device is a positioning function node, the first time difference is a time difference between a downlink positioning reference signal sent by the positioning function node and an uplink positioning reference signal reported by the terminal device.

If the terminal device reports a plurality of pieces of first time difference information to the network device, where the plurality of pieces of first time difference information include a plurality of first time differences, the terminal device may report the plurality of first time differences in incremental mode. Optionally, the first message further includes first indication information, and the first indication information is used to indicate that the terminal device reports the plurality of first time differences in incremental mode. In other words, the terminal device may notify the network device of a time difference reporting manner by using the first indication information.

When the terminal device reports the plurality of first time differences to the network device, the $1^{st}$ time difference reported by the terminal device may be an absolute time difference between an uplink positioning reference signal and a downlink positioning reference signal, and a time difference subsequently reported by the terminal device is a relative time difference between a subsequent downlink positioning reference signal and the $1^{st}$ downlink positioning reference signal.

For example, for a downlink positioning reference signal 1, a downlink positioning reference signal 2, a downlink positioning reference signal 3, and an uplink positioning reference signal 4, a time difference that is first reported by the terminal device may be a time difference between the downlink positioning reference signal 1 and the uplink positioning reference signal 4. For the downlink positioning reference signal 2, only a relative time difference between the downlink positioning reference signal 2 and the downlink positioning reference signal 1 may be reported. Correspondingly, the network device may deduce a time difference between the downlink positioning reference signal 2 and the uplink positioning reference signal 4 based on the relative time difference between the downlink positioning reference signal 2 and the downlink positioning reference signal 1.

For another example, for a positioning reference signal pair 1, a positioning reference signal pair 2, and a positioning reference signal pair 3, each reference signal pair includes a downlink reference signal and an uplink reference signal. The time difference is a time difference between a downlink reference signal and an uplink reference signal of a reference signal pair. Assuming that a time difference of the positioning reference signal pair 1 is a first measured time difference, the time difference of the reference signal pair 1 is an absolute time difference, a time difference of the positioning reference signal pair 2 is a relative value of the time difference of the reference signal pair 1, and a time difference of the reference signal pair 3 is a relative value of the time difference of the reference signal pair 2, or the time difference of the reference signal pair 3 is a relative value of the time difference of the reference signal pair 1. To be specific, a time difference of a subsequent reference signal pair may be a relative value of a time difference of a previous reference signal pair, or may be a relative value of an absolute time difference of the first reference signal pair. This is not specifically limited in this application.

An advantage of the foregoing method is as follows: Bits occupied by the absolute time difference reported by the terminal device are greater than bits occupied by the relative time difference reported by the terminal device, and the terminal device does not need to report the absolute time difference each time, thereby helping reduce bit overheads.

The terminal device may report a time difference for a serving cell or different cells, or may report measurement results for a plurality of cells in a mixed manner. This is not specifically limited.

A possible manner of reporting the first time difference by the terminal device is described below with reference to specific examples.

Example 1: The terminal device may report a time difference between a boundary of a downlink subframe j of a serving cell and a boundary of an uplink subframe i corresponding to an uplink positioning reference signal. The time difference may be calculated based on a same subframe index. Optionally, the time difference may be a time difference between a boundary of a time unit in a cell to which an uplink positioning reference signal belongs and a boundary of a start time point of a time unit in a cell to which a downlink positioning reference signal belongs in a same serving cell.

Example 2: For a same cell, the terminal device may report time differences corresponding to different positioning reference signals, or may report a time difference between a group of uplink positioning reference signal and downlink positioning reference signal as a reference time difference, and subsequently report a time difference or a receiving time point by using a delta.

If a cell sends one downlink positioning reference signal, the terminal device may report a time difference between the downlink positioning reference signal and an uplink positioning reference signal in the cell or in another cell, where an ID of the downlink positioning reference signal and/or an ID of the uplink positioning reference signal may be further carried.

If one cell sends a plurality of downlink positioning reference signals, the terminal device may separately report a time difference between each of the plurality of different downlink positioning reference signals and an uplink positioning reference signal. Alternatively, the terminal device may first report a time difference between a group of uplink positioning reference signal and downlink positioning reference signal as a reference time difference, and report a time difference corresponding to another downlink positioning reference signal and another uplink positioning reference signal by using a delta.

For example, for a downlink positioning reference signal 1, a downlink positioning reference signal 2, a downlink positioning reference signal 3, an uplink positioning reference signal 4, and an uplink positioning reference signal 5, the terminal device may report a time difference between the downlink positioning reference signal 1 and the uplink positioning reference signal 4. For the downlink positioning reference signal 2, only a relative time difference between the downlink positioning reference signal 2 and the downlink positioning reference signal 1 may be reported, and a time difference between the downlink positioning reference signal 2 and the uplink positioning reference signal 4 may be deduced based on the relative time difference between the downlink positioning reference signal 2 and the downlink positioning reference signal 1.

Similarly, for the downlink positioning reference signal 3, only a relative time difference between the downlink positioning reference signal 3 and the downlink positioning reference signal 1 may be reported, and a time difference between the downlink positioning reference signal 3 and the uplink positioning reference signal 4 may be deduced based on the relative time difference between the downlink positioning reference signal 3 and the downlink positioning reference signal 1.

Likewise, for the uplink positioning reference signals, a time difference between the uplink positioning reference signal 5 and the uplink positioning reference signal 4 may be reported. Optionally, the terminal device may further report a time difference (denoted as a time difference 1) between the downlink positioning reference signal 1 and the uplink positioning reference signal 4, and then report a difference between the time difference 1 and a time difference (denoted as a time difference 2) between the downlink positioning reference signal 2 and the uplink positioning reference signal 5, that is, report a difference obtained by subtracting the time difference 1 from the time difference 2. It should be understood that the foregoing examples are merely for ease of understanding by a person skilled in the art, and do not constitute any limitation on the embodiments of this application.

It should be understood that, in the foregoing method, a time difference between downlink positioning reference signals and/or a time difference between uplink positioning reference signals are/is separately reported. In this case, correspondingly, the first message may include a plurality of relative time differences, so that calculation of a time difference of a positioning reference signal pair can be completed.

Generally, the foregoing method for calculating the relative time difference of the positioning reference signal pair is simpler. Details are not described again. When a plurality of downlink positioning reference signals sent in a same cell correspond to a same uplink positioning reference signal, a method for calculating a relative time difference between downlink positioning reference signals causes lower overheads. A specific method for reporting a time point and/or a time difference is not limited in this application.

Herein, the terminal device reports time differences corresponding to different positioning reference signals in a same cell, so that the positioning function node learns of a propagation delay and related confidence with which a transmit beam corresponding to each reference signal arrives at the terminal device. In this way, the positioning function node may determine, by using redundant information of a plurality of beams, whether miss detection, false alarm, blocking, or the like occurs on a transmit beam.

Example 3: The terminal device reports a time difference between an uplink subframe and a downlink subframe of a specific cell (for example, a serving cell, a primary cell (PCell), or a cell specified by a network), and additionally reports a time difference between one or more uplink positioning reference signals or downlink positioning reference signals and a timing boundary of the cell, including a time difference obtained by using a same index or closest subframe boundary.

If time differences of a plurality of cells need to be reported, the terminal device may first report a time difference between a group of uplink positioning reference signal and downlink positioning reference signal in a serving cell, then select a time difference between a group of uplink positioning reference signal and downlink positioning reference signal in the serving cell as a reference, and report a time difference of a neighboring cell.

Specifically, for the neighboring cell, the terminal device may report a relative time difference between a downlink positioning reference signal in the neighboring cell and the downlink positioning reference signal in the serving cell, and then may deduce, based on the time difference between the uplink positioning reference signal and the downlink positioning reference signal in the serving cell, the time difference corresponding to the neighboring cell.

Optionally, for any one of the cases described in the example 1 to the example 3, when reporting a time difference, the terminal device may simultaneously report an ID of a related downlink positioning reference signal and/or an ID of a related uplink positioning reference signal. However, this is not specifically limited in the embodiments of this application.

In this embodiment of this application, optionally, the first message sent by the terminal device to the network device may be a measurement result for one or more of the following objects:

(1) a measurement result for a receive beam and/or a panel, where the measurement result may further include an ID of the receive beam, a sounding reference signal (sounding reference signal, SRS) ID corresponding to a transmit beam that is obtained based on reciprocity and that corresponds to the receive beam, an antenna panel identifier, and the like;

(2) a measurement result for an identifiable path of a downlink received signal;

(3) a measurement result for a cell, where the measurement result may further include cell information (for example, a cell ID or a physical cell identifier (physical cell ID, PCI));

(4) a measurement result for one or more downlink positioning reference signals, where the measurement result may further include identifier information of the downlink positioning reference signal; and (5) a measurement result for one or more uplink reference signals, where the measurement result may further include signal identification information such as an identifier or a RACH of the uplink reference signal.

In other words, the terminal device may perform measurement for one or more of the foregoing five cases, to report the first time difference information to the network device. It should be understood that the foregoing five cases are merely examples for description, and do not constitute a limitation on this embodiment of this application. Optionally, the first message may further include association information of the uplink positioning reference signal, for example, time association information, beam association information, and spatial association information.

Optionally, the first message may further include power information. Optionally, power information of an uplink positioning reference signal may be indicated by using an index of a downlink positioning reference signal and/or an index of an uplink positioning reference signal. When the power information of the uplink positioning reference signal is associated with a downlink positioning reference signal, it indicates that the indicated transmit power of the uplink positioning reference signal is determined by the downlink positioning reference signal (for example, calculating a path loss). When the power information of the uplink positioning reference signal is associated with another uplink positioning reference signal B, it indicates that the indicated transmit power of the uplink positioning reference signal is the same as that of the uplink positioning reference signal B.

In this embodiment of this application, the terminal device may further report a positioning capability of the terminal device to the network device in advance. Optionally, the method 300 further includes:

The terminal device sends positioning capability information of the terminal device to one or more network devices, where the positioning capability information includes one or more of the following information: capability information used to indicate whether the terminal device supports cross-frequency round-trip time RTT measurement reporting, information about an uplink frequency and a downlink frequency that are supported by the terminal device, capability information used to indicate whether the terminal device supports multi-antenna panel RTT measurement reporting, capability information used to indicate whether the terminal device supports multi-path RTT measurement reporting, and capability information used to indicate whether the terminal device supports blind detection of an SSB used for positioning. The positioning capability information may further include a quantity of reference signals that can be received (including simultaneous receiving and non-simultaneous receiving) by the terminal device, and a quantity of reference signals that can be sent by the terminal device.

In other words, the terminal device may report, to the network device, an RTT positioning capability of the terminal device, for example, whether the terminal device supports inter-frequency RTT measurement reporting. If the terminal device supports inter-frequency RTT measurement reporting, the terminal device may further report supported uplink and downlink frequencies and information about a gap required for frequency switching.

A measurement behavior has been described on the terminal device side, and a measurement behavior on a network device side is to be described below. It should be understood that, if terms or concepts that are the same as or similar to those in the method 300 are involved, for related explanations, refer to the foregoing descriptions, and details are not described below again.

For the network device, the network device may receive the first message sent by the terminal device, and forward the first message to the positioning function node. Alternatively, the network device may measure an uplink positioning reference signal and a downlink positioning reference signal, and forward a measurement result to the positioning function node. Optionally, the network device may alternatively interact with a network device or a positioning apparatus (for example, an LMU or a TBS) in a neighboring cell, to obtain a measurement result.

Figure 5:
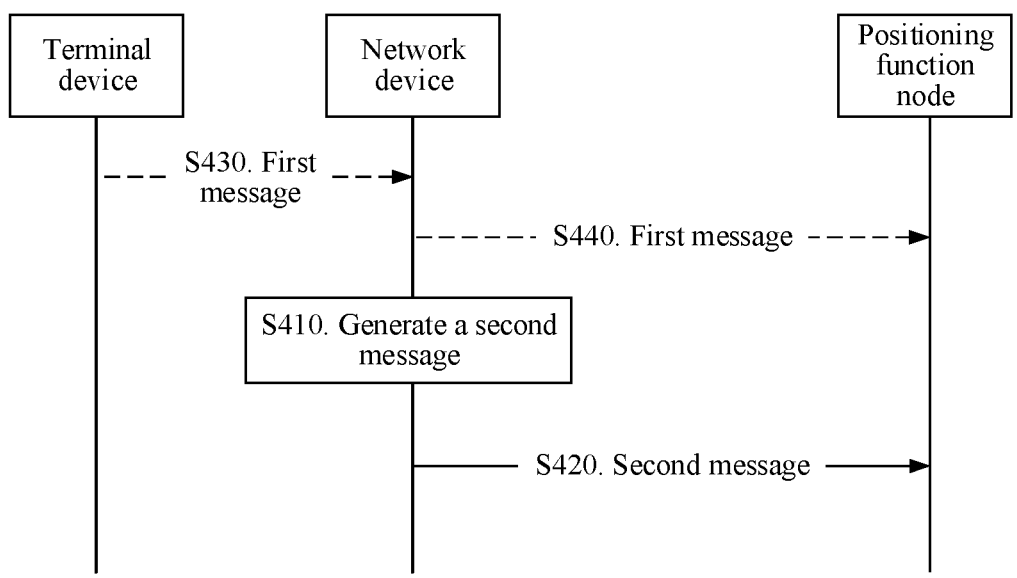
FIG. 5 is a schematic interaction diagram of a method for positioning a terminal device according to another embodiment of this application.

FIG. 5 is a schematic interaction diagram of a method 400 for positioning a terminal device according to another embodiment of this application. As shown in FIG. 5, the method 400 includes the following steps.

S410. A network device generates a second message, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal.

S420. The network device sends the second message to a positioning function node. Correspondingly, the positioning function node receives the second message.

It should be understood that for an explanation or a definition of the second time difference, refer to related descriptions of the first time difference. For brevity, details are not described herein again.

For example, the network device may measure a time difference between positioning reference signals, and send one or more pieces of second time difference information obtained through measurement to the positioning function node, to assist the positioning function node in performing positioning. Optionally, the network device may measure different positioning reference signals of different terminal devices or a same terminal device, or measure different propagation paths of a same positioning reference signal.

The network device may configure, for a terminal device, a downlink positioning reference signal whose configuration resource corresponds to an uplink positioning reference signal. In this way, the network device does not need to request the terminal device to report a second uplink positioning reference signal corresponding to a second downlink positioning reference signal.

Alternatively, a terminal device may determine a downlink positioning reference signal of which a resource corresponds to an uplink positioning reference signal. The network device may learn, through reporting by the terminal device, a downlink positioning reference signal and an uplink positioning reference signal that correspond to each other.

Similarly, when the network device sends a plurality of second time differences to the positioning function node, reporting may also be performed in incremental mode. Specifically, the $1^{st}$ time difference sent by the network device to the positioning function node is an absolute time difference between an uplink positioning reference signal and a downlink positioning reference signal. In the plurality of second time differences, a subsequent time difference of the $1^{st}$ time difference is a relative time difference relative to the $1^{st}$ time difference. For details, refer to the foregoing descriptions, and details are not described again. Therefore, this sending manner helps reduce overheads of the network device.

Optionally, the second message may carry second indication information, and the second indication information is used to indicate that the network device sends the plurality of second time differences in incremental mode.

The network device may not only send, to the positioning function node, the one or more pieces of second time difference information determined by the network device, but also send, to the positioning function node, one or more pieces of first time difference information sent by the terminal device, to assist the positioning function node in performing positioning.

Optionally, the method 400 further includes the following steps.

S430. The network device receives a first message from the terminal device, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal.

S440. The network device sends the first message to the positioning function node.

In other words, the network device may forward, to the positioning function node, the first message sent by the terminal device, so that the positioning function node obtains related measurement of the terminal device, to perform positioning. Herein, step S430 may correspond to step S320 in the foregoing method 300. For related explanations, refer to the foregoing descriptions.

In an embodiment, the network device receives the first message sent by the terminal device, and the network device calculates the RTT of each positioning reference signal pair based on the one or more pieces of first time difference information in the first message and the one or more pieces of second time difference information determined by the network device, and sends the RTT of each reference signal pair to the positioning function node.

The network device may send the first message and/or the second message to the positioning function node based on a request of the positioning function node. Optionally, the method 400 further includes the following steps.

The positioning function node determines a network device participating in positioning; the positioning function node sends request information to the network device, where the request information is used to obtain measurement information required for positioning a terminal device; and correspondingly, the network device receives the request information from the positioning function node.

For example, the positioning function node may specify one or more cells to configure an uplink positioning reference signal, or may specify one or more cells to send a downlink positioning reference signal. The positioning function node may provide a cell with a related configuration of an uplink positioning reference signal (for example, a signal type, a sending bandwidth, a quantity of sending times, a time-frequency resource, and a sequence of the uplink positioning reference signal).

Optionally, the request information includes one or more of the following information: identification information of the terminal device, positioning capability information of the terminal device, information about space in which the terminal device is located, positioning manner information, positioning reporting information, positioning configuration information, delay information of the terminal device, angle information of the terminal device, and power information of the terminal device. It should be understood that some information in the request information may not be delivered at a time, and may be delivered by using signaling similar to assistant data. This is not specifically limited.

The information about the space in which the terminal device is located may include one or more of the following information: a current serving cell and a current serving beam that correspond to the terminal device, a previous measurement result (a beam measurement result, a cell measurement result, a timing advance (timing advance, TA), and the like) provided by the serving cell for the terminal device, approximate geographical location information of the terminal device, and a measurement result previously obtained by the terminal device itself.

The positioning reporting information includes at least one of a reporting periodicity (a time period or a quantity of times of continuous reporting) and reporting triggered by an event (where the event includes a change of a serving beam, a change of a cell, a change of a connection status of the terminal device (for example, from a connected state to an inactive state or an idle state), and the like).

The positioning configuration information includes at least one of a type (for example, a PRS, a CIS-RS, or a TRS), a sending bandwidth, a quantity of sending times, a time-frequency resource, a sequence, and the like of a downlink positioning reference signal (which may be a downlink positioning reference signal recommended to be configured by the positioning function node), and a type (an SRS, an uplink PRS, or a phase tracking RS (phase noise tracking RS, PTRS)), a sending bandwidth, a quantity of sending times, a time-frequency resource, and a sequence of an uplink positioning reference signal (which may be an uplink positioning reference signal recommended to be configured by the positioning function node).

The delay information of the terminal device may include an expected delay value. The expected delay value refers to a possible arrival time window of the terminal device that is detected by the network device, where the arrival time window may use network time as a reference system or may be a delay relative to a boundary of a time unit determined by using a reference signal (for example, a reference signal (for example, an SSB) of a cell).

The angle information of the terminal device may be used to assist the network device in configuring a related downlink positioning reference signal and a receive beam for the terminal device. The angle information of the terminal device may include an expected angle value. The expected angle value is an expected receiving direction or an expected downlink sending direction of the network device for the terminal device. The expected angle value may be an angle value in a spatial coordinate system, or may be a direction corresponding to a reference signal (for example, a reference signal (for example, an SSB) of the cell). This indicates that a relative location or a transmit beam of the terminal device roughly faces a direction of a transmit beam of a positioning reference signal. The expected angle value may be determined by pre-measuring and/or roughly positioning the terminal device.

The power information of the terminal device may include an expected power value, which may be an absolute power in a unit of decibel-milliwatt (dBm), watt, or the like, or may be an expected power value of a positioning reference signal (for example, a positioning reference signal of a serving cell). This indicates that a transmit power of the terminal device is calculated by using the positioning reference signal (for example, a path loss). The network device may further send cell information to the positioning function node (where a cell may be a cell measured by the network device, or the cell information may be cell that corresponds to a measurement result of a cell and that is reported by the terminal device).

For the positioning function node, the positioning function node may obtain the first message, and position the terminal device based on the one or more pieces of first time difference information in the first message; may obtain the second message from the network device, and position the terminal device based on the one or more pieces of second time information in the second message; or may obtain both the first message and the second message, and position the terminal device jointly based on the one or more pieces of first time difference information in the first message and the one or more pieces of second time information in the second message. This is not limited in the embodiments of this application.

It should be understood that the embodiments of this application may be independently implemented, or may be properly combined, and the explanation or description of the terms in the embodiments may be cited or explained in the embodiments. This is not limited in this application.

It should be further understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The method for positioning a terminal device is described in detail above according to the embodiments of this application with reference to FIG. 1 to FIG. 5. An apparatus for positioning a terminal device is to be described below according to the embodiments of this application with reference to FIG. 6 to FIG. 11. It should be understood that the technical features described in the method embodiments are also applicable to the following apparatus embodiments.

Figure 6:
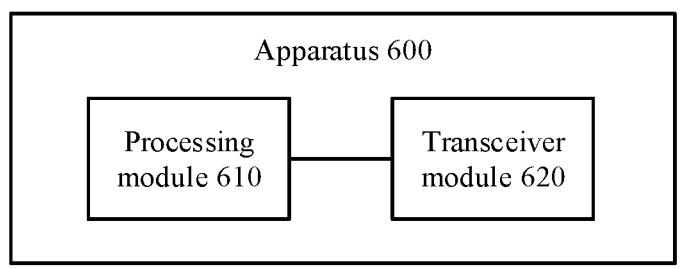
FIG. 6 is a schematic block diagram of a communication apparatus according to an embodiment of this application.

FIG. 6 is a schematic block diagram of a communication apparatus 600 according to an embodiment of this application. The apparatus 600 is configured to perform the method performed by the terminal device in the foregoing method embodiments. Optionally, a specific form of the apparatus 600 may be a terminal device or a chip in the terminal device. This is not limited in this embodiment of this application. The apparatus 600 includes:

a processing module 610, configured to generate a first message, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal; and a transceiver module 620, configured to send the first message to a network device.

In an embodiment, the transceiver module 620 is further configured to receive configuration information from the network device, where the configuration information is used to indicate a configuration resource of the first downlink positioning reference signal that corresponds to the first uplink positioning reference signal and that is in a plurality of downlink positioning reference signals.

In an embodiment, when the first message includes a plurality of pieces of first time difference information, in a plurality of first time differences sent by the transceiver module 620 to the network device, the 1$^{st}$ time difference is an absolute time difference between an uplink positioning reference signal and the 1$^{st}$ downlink positioning reference signal, and a subsequent time difference of the 1$^{st}$ time difference is a relative time difference between a subsequent downlink positioning reference signal and the 1$^{st}$ downlink positioning reference signal.

Optionally, the first message further includes first indication information, and the first indication information is used to indicate that the apparatus reports the plurality of pieces of first time difference information in incremental mode.

Optionally, the first message further includes one or more of the following information: a sending time point of one or more uplink positioning reference signals and a receiving time point of one or more downlink positioning reference signals.

Optionally, the receiving time point includes any one of the following:

(1) an actual receiving time point of the downlink positioning reference signal;

(2) a start time point and/or an end time point of a time unit determined based on the receiving time point of the downlink positioning reference signal; and (3) a start time point and/or an end time point of a time unit in a cell to which the downlink positioning reference signal belongs.

Optionally, the sending time point includes any one of the following:

(1) an actual sending time point of the uplink positioning reference signal;

(2) a start time point and/or an end time point of a time unit determined based on the sending time point of the uplink positioning reference signal; and (3) a start time point and/or an end time point of a time unit in a cell to which the uplink positioning reference signal belongs.

In an embodiment, the transceiver module 620 is further configured to send positioning capability information of the terminal device to one or more network devices, where the positioning capability information includes one or more of the following information: capability information used to indicate whether the terminal device supports cross-frequency round-trip time RTT measurement reporting, information about an uplink frequency and a downlink frequency that are supported by the terminal device, capability information used to indicate whether the terminal device supports multi-antenna panel RTT measurement reporting, capability information used to indicate whether the terminal device supports multi-path RTT measurement reporting, and capability information used to indicate whether the terminal device supports blind detection of a synchronization signal block SSB used for positioning.

It should be understood that the communication apparatus 600 in this embodiment of this application may correspond to the method performed by the terminal device in the foregoing method embodiments. In addition, the foregoing and other management operations and/or functions of the modules in the apparatus 600 are separately used to implement corresponding steps of the method performed by the terminal device in the foregoing method embodiments. Therefore, the beneficial effects in the foregoing method embodiments can also be achieved. For brevity, details are not described herein.

It should further be understood that the modules in the apparatus 600 may be implemented in a form of software and/or hardware. This is not specifically limited. In other words, the apparatus 600 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 600 may be in a form shown in FIG. 7. The processing module 610 may be implemented by using a processor 701 shown in FIG. 7. The transceiver module 620 may be implemented by using a transceiver 703 shown in FIG. 7. Specifically, the processor is implemented by executing a computer program stored in a memory. Optionally, when the apparatus 600 is a chip, a function and/or an implementation process of the transceiver module 610 may be alternatively implemented by using a pin, a circuit, or the like. Optionally, the memory is a storage unit in the chip, for example, a register or a cache. The storage unit may alternatively be a storage unit, such as a memory 702 shown in FIG. 7, that is in the computer device and that is located outside the chip.

For hardware implementation, the transceiver module 620 may be a transceiver, and the transceiver (in FIG. 6, the transceiver module 620 is used as an example) constitutes a communication interface in a communication unit.

Figure 7:
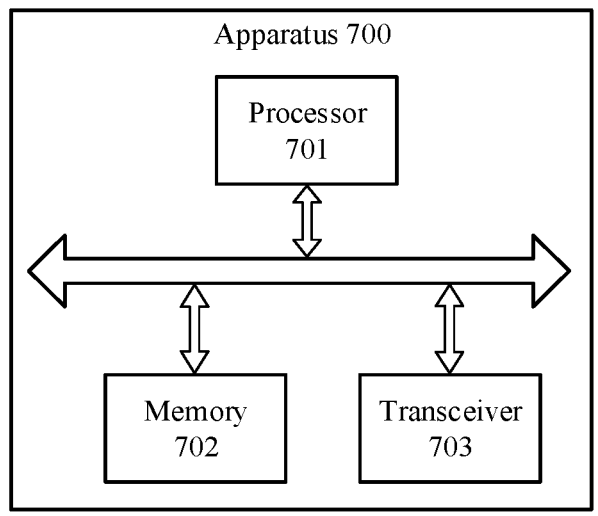
FIG. 7 is a schematic structural diagram of a communication apparatus according to an embodiment of this application.

FIG. 7 is a schematic structural diagram of a communication apparatus 700 according to an embodiment of this application. As shown in FIG. 7, the apparatus 700 includes a processor 701, and the processor 701 is configured to control and manage an action of the apparatus.

In an embodiment, the processor 701 is configured to generate a first message, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal. The processor 701 is configured to invoke an interface to perform the following action: sending the first message to a network device.

It should be understood that the processor 701 may invoke the interface to perform the foregoing receiving and sending actions. The invoked interface may be a logical interface or a physical interface. This is not limited. Optionally, the physical interface may be implemented by a transceiver. Optionally, the apparatus 700 further includes a transceiver 703.

Optionally, the apparatus 700 further includes a memory 702, and the memory 702 may store program code in the foregoing method embodiments, so that the processor 701 invokes the program code. The memory 702 may be or may not be coupled to the processor 701.

For example, if the apparatus 700 includes the processor 701, the memory 702, and the transceiver 703, the processor 701, the memory 702, and the transceiver 703 communicate with each other through an inner connection path, to transmit a control signal and/or a data signal. In a possible design, the processor 701, the memory 702, and the transceiver 703 may be implemented by using a chip. The processor 701, the memory 702, and the transceiver 703 may be implemented in a same chip, or may be separately implemented in different chips, or functions of any two of the processor 701, the memory 702, and the transceiver 703 are implemented in one chip. The memory 702 may store the program code, and the processor 701 invokes the program code stored in the memory 702, to implement a corresponding function of the apparatus 700. It should be understood that the apparatus 700 may be further configured to perform other steps and/or operations on the terminal device side in the foregoing embodiments. For brevity, details are not described herein.

It should be understood that the apparatus 700 may be further configured to perform other steps and/or operations on the terminal device side in the foregoing embodiments. For brevity, details are not described herein.

Figure 8:
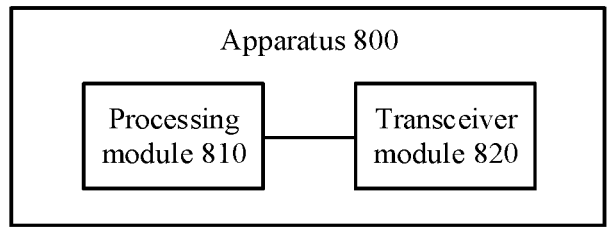
FIG. 8 is a schematic block diagram of an apparatus for positioning a terminal device according to another embodiment of this application.

FIG. 8 is a schematic block diagram of a communication apparatus 800 according to an embodiment of this application. The apparatus 800 is configured to perform the method performed by the network device in the foregoing method embodiments. Optionally, a specific form of the apparatus 800 may be a network device or a chip in the network device. This is not limited in this embodiment of this application. The apparatus 800 includes:

a processing module 810, configured to generate a second message, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal; and a transceiver module 820, configured to send the second message to a positioning function node.

In an embodiment, a configuration resource of the second downlink positioning reference signal corresponding to the second uplink positioning reference signal is configured by the apparatus for a terminal device.

In an embodiment, the apparatus configures a plurality of downlink positioning reference signal resources for a terminal device, and a resource that is of the second downlink positioning reference signal and that corresponds to a resource of the second uplink positioning reference signal is determined by the terminal device in the plurality of downlink positioning reference signal resources.

In an embodiment, when the second message includes a plurality of pieces of second time difference information, the $1^{st}$ time difference sent by the transceiver module 820 to the positioning function node is an absolute time difference between an uplink positioning reference signal and the $1^{st}$ downlink positioning reference signal, and a subsequent time difference of the $1^{st}$ time difference is a relative time difference between a subsequent downlink positioning reference signal and the $1^{st}$ downlink positioning reference signal.

Optionally, the second message further includes second indication information, and the second indication information is used to indicate that the apparatus sends the plurality of pieces of second time difference information in incremental mode.

In an embodiment, the transceiver module 820 is further configured to: receive a first message from the terminal device, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal; and send the first message to the positioning function node.

In an embodiment, the transceiver module 820 is further configured to receive request information from the positioning function node, where the request information is used to obtain measurement information required for positioning the terminal device.

Optionally, the request information includes one or more of the following information: identification information of the terminal device, positioning capability information of the terminal device, information about space in which the terminal device is located, positioning manner information, positioning reporting information, positioning configuration information, delay information of the terminal device, angle information of the terminal device, and power information of the terminal device.

It should be understood that the apparatus 800 for positioning a terminal device in this embodiment of this application may correspond to the method performed by the network device in the foregoing method embodiments, for example, the method in FIG. 6. In addition, the foregoing and other management operations and/or functions of the modules in the apparatus 800 are separately used to implement corresponding steps of the method performed by the network device in the foregoing method embodiments. Therefore, the beneficial effects in the foregoing method embodiments can also be achieved. For brevity, details are not described herein.

It should further be understood that the modules in the apparatus 800 may be implemented in a form of software and/or hardware. This is not specifically limited. In other words, the apparatus 800 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 800 may be in a form shown in FIG. 9. The processing module 810 may be implemented by using a processor 901 shown in FIG. 9. The transceiver module 820 may be implemented by using a transceiver 903 shown in FIG. 9. Specifically, the processor is implemented by executing a computer program stored in a memory. Optionally, when the apparatus 800 is a chip, a function and/or an implementation process of the transceiver module 810 may be alternatively implemented by using a pin, a circuit, or the like. Optionally, the memory is a storage unit in the chip, for example, a register or a cache. The storage unit may alternatively be a storage unit, such as a memory 902 shown in FIG. 9, that is in the computer device and that is located outside the chip.

For hardware implementation, the transceiver module 820 may be a transceiver, and the transceiver (in FIG. 8, the transceiver module 820 is used as an example) constitutes a communication interface in a communication unit.

Figure 9:
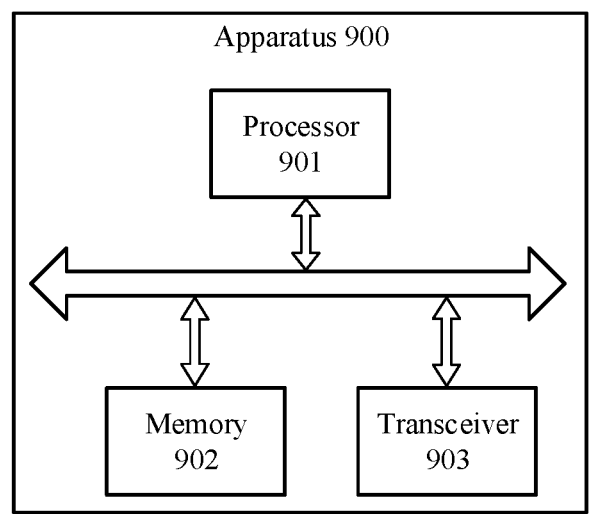
FIG. 9 is a schematic structural diagram of an apparatus for positioning a terminal device according to another embodiment of this application.

FIG. 9 is a schematic structural diagram of a communication apparatus 900 according to an embodiment of this application. As shown in FIG. 9, the apparatus 900 includes a processor 901, and the processor 901 is configured to control and manage an action of the communication apparatus.

In an embodiment, the processor 901 is configured to generate a second message, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal. The processor 901 is configured to invoke an interface to perform the following action: sending the second message to a positioning function node.

It should be understood that the processor 901 may invoke the interface to perform the foregoing receiving and sending actions. The invoked interface may be a logical interface or a physical interface. This is not limited. Optionally, the physical interface may be implemented by a transceiver. Optionally, the apparatus 900 further includes a transceiver 903.

Optionally, the apparatus 900 further includes a memory 902, and the memory 902 may store program code in the foregoing method embodiments, so that the processor 901 invokes the program code. The memory 902 may be or may not be coupled to the processor 901.

For example, if the apparatus 900 includes the processor 901, the memory 902, and the transceiver 903, the processor 901, the memory 902, and the transceiver 903 communicate with each other through an inner connection path, to transmit a control signal and/or a data signal. In a possible design, the processor 901, the memory 902, and the transceiver 903 may be implemented by using a chip. The processor 901, the memory 902, and the transceiver 903 may be implemented in a same chip, or may be separately implemented in different chips, or functions of any two of the processor 901, the memory 902, and the transceiver 903 are implemented in one chip. The memory 902 may store the program code, and the processor 901 invokes the program code stored in the memory 902, to implement a corresponding function of the apparatus 900.

It should be understood that the apparatus 900 may be further configured to perform other steps and/or operations on the network device side in the foregoing embodiments. For brevity, details are not described herein.

Figure 10:
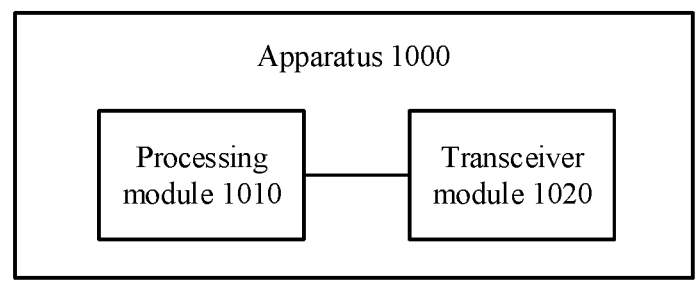
FIG. 10 is a schematic block diagram of an apparatus for positioning a terminal device according to still another embodiment of this application.

FIG. 10 is a schematic block diagram of a communication apparatus 1000 according to an embodiment of this application. The apparatus 1000 is configured to perform the method performed by the positioning function node in the foregoing method embodiments. Optionally, a specific form of the apparatus 1000 may be a positioning function node or a chip in the positioning function node. This is not limited in this embodiment of this application. The apparatus 1000 includes:

a processing module 1010, configured to determine a network device participating in positioning; and a transceiver module 1020, configured to send request information to the network device, where the request information is used to obtain measurement information required for positioning a terminal device.

The transceiver module 1020 is further configured to receive a second message from the network device, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal.

In an embodiment, the transceiver module 1020 is further configured to receive a first message from the network device, where the first message includes one or more pieces of first time difference information, and the first time difference information includes a first time difference and information about a first positioning reference signal pair corresponding to the first time difference, where the first positioning reference signal pair includes a first uplink positioning reference signal and a first downlink positioning reference signal that have an association relationship, and the first time difference is a time difference between a sending time point of the first uplink positioning reference signal and a receiving time point of the first downlink positioning reference signal.

Optionally, the request information includes one or more of the following information: identification information of the terminal device, positioning capability information of the terminal device, information about space in which the terminal device is located, positioning manner information, positioning reporting information, positioning configuration information, delay information of the terminal device, angle information of the terminal device, and power information of the terminal device.

It should be understood that the apparatus 1000 for positioning a terminal device in this embodiment of this application may correspond to the method performed by the positioning function node in the foregoing method embodiments, for example, the method in FIG. 10. In addition, the foregoing and other management operations and/or functions of the modules in the apparatus 1000 are separately used to implement corresponding steps of the method performed by the positioning function node in the foregoing method embodiments. Therefore, the beneficial effects in the foregoing method embodiments can also be achieved. For brevity, details are not described herein.

It should further be understood that the modules in the apparatus 1000 may be implemented in a form of software and/or hardware. This is not specifically limited. In other words, the apparatus 1000 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 1000 may be in a form shown in FIG. 11. The processing module 1010 may be implemented by using a processor 1101 shown in FIG. 11. The transceiver module 1020 may be implemented by using a transceiver 1103 shown in FIG. 11. Specifically, the processor is implemented by executing a computer program stored in a memory. Optionally, when the apparatus 1000 is a chip, a function and/or an implementation process of the transceiver module 1010 may be alternatively implemented by a pin, a circuit, or the like. Optionally, the memory is a storage unit in the chip, for example, a register or a cache. The storage unit may alternatively be a storage unit, such as a memory 1102 shown in FIG. 11, that is in the computer device and that is located outside the chip.

For hardware implementation, the transceiver module 1020 may be a transceiver, and the transceiver (in FIG. 10, the transceiver module 1020 is used as an example) constitutes a communication interface in the communication unit.

Figure 11:
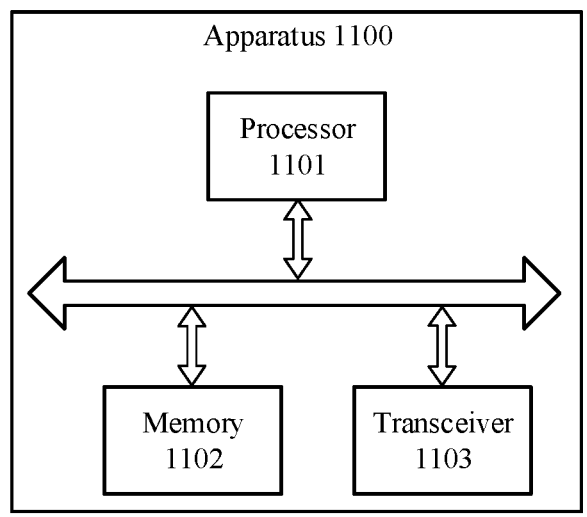
FIG. 11 is a schematic structural diagram of an apparatus for positioning a terminal device according to still another embodiment of this application.

FIG. 11 is a schematic structural diagram of a communication apparatus 1100 according to an embodiment of this application. As shown in FIG. 11, the apparatus 1100 includes a processor 1101, and the processor 1101 is configured to control and manage an action of the communication apparatus.

In an embodiment, the processor 1101 is configured to determine a network device participating in positioning. The processor 1101 is further configured to invoke an interface to perform the following actions: sending request information to the network device, where the request information is used to obtain measurement information required for positioning a terminal device; and receiving a second message from the network device, where the second message includes one or more pieces of second time difference information, and the second time difference information includes a second time difference and information about a second positioning reference signal pair corresponding to the second time difference, where the second positioning reference signal pair includes a second uplink positioning reference signal and a second downlink positioning reference signal that have an association relationship, and the second time difference is a time difference between a sending time point of the second uplink positioning reference signal and a receiving time point of the second downlink positioning reference signal.

It should be understood that the processor 1101 may invoke the interface to perform the foregoing receiving and sending actions. The invoked interface may be a logical interface or a physical interface. This is not limited. Optionally, the physical interface may be implemented by a transceiver. Optionally, the apparatus 1100 further includes a transceiver 1103.

Optionally, the apparatus 1100 further includes a memory 1102, and the memory 1102 may store program code in the foregoing method embodiments, so that the processor 1101 invokes the program code. The memory 1102 may be or may not be coupled to the processor 1101.

For example, if the apparatus 1100 includes the processor 1101, the memory 1102, and the transceiver 1103, the processor 1101, the memory 1102, and the transceiver 1103 communicate with each other through an inner connection path, to transmit a control signal and/or a data signal. In a possible design, the processor 1101, the memory 1102, and the transceiver 1103 may be implemented by using a chip. The processor 1101, the memory 1102, and the transceiver 1103 may be implemented in a same chip, or may be separately implemented in different chips, or functions of any two of the processor 1101, the memory 1102, and the transceiver 1103 are implemented in one chip. The memory 1102 may store program code, and the processor 1101 invokes the program code stored in the memory 1102, to implement a corresponding function of the apparatus 1100.

It should be understood that the apparatus 1100 may be further configured to perform other steps and/or operations on the positioning function node side in the foregoing embodiments. For brevity, details are not described herein.

The method disclosed in the embodiments of this application may be applied to a processor or may be implemented by a processor. The processor may be an integrated circuit chip and has a signal processing capability. In an implementation process, steps in the foregoing method embodiments may be implemented by using an integrated logical circuit of hardware in the processor or by using instructions in a form of software.

The processor may be a general-purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. It may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and method described in this specification include but are not limited to these memories and any memory of another suitable type.

It should be understood that in the embodiments of this application, numbers "first", "second", and the like are merely used to distinguish between different objects, for example, to distinguish between different time differences and between different positioning reference signals, and do not constitute a limitation on the scope of the embodiments of this application. The embodiments of this application are not limited thereto.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that units and algorithm steps in the examples described with reference to the embodiments disclosed in this specification may be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for positioning a terminal device in communication with a network device, the method comprising:

determining, by the terminal device, a first time difference;

generating, by the terminal device, a first message comprising time difference information, wherein the time difference information comprises:
the first time difference, and
an identifier of a related downlink positioning reference signal that is a downlink positioning signal of a positioning reference signal pair,
wherein the first time difference corresponds to the related downlink positioning reference signal,
wherein the positioning reference signal pair comprises:
a first uplink positioning reference signal, and
a first downlink positioning reference signal; and
wherein the first time difference is a time duration between a first time point and a second time point, wherein:
the first time point is a time point at which the terminal device receives, via the first downlink positioning signal, a downlink subframe, and
the second time point is a time point at which the terminal device transmits an uplink subframe that is closest in time to the first time point; and sending, by the terminal device, the first message to the network device, wherein the first message, after receipt by the network device, is provided to a positioning function for use in determining the positioning of the terminal device.

2. The method according to claim 1, wherein the method further comprises:
sending, by the terminal device, positioning capability information of the terminal device to one or more network devices, wherein the positioning capability information comprises one or more pieces of information taken from the group consisting of:
capability information used to indicate whether the terminal device supports cross-frequency round-trip time (RTT) measurement reporting,
information about an uplink frequency and a downlink frequency that are supported by the terminal device,
capability information used to indicate whether the terminal device supports multi-antenna panel RTT measurement reporting,
capability information used to indicate whether the terminal device supports multi-path RTT measurement reporting, and
capability information used to indicate whether the terminal device supports blind detection of a synchronization signal block (SSB) used for positioning.

3. The method according to claim 1, further comprising:
determining the network device participating in positioning;
sending request information to the network device, wherein the request information is used to obtain measurement information required for positioning the terminal device; and
receiving a second message from the network device, wherein the second message comprises second time difference information that comprises a second time difference and information about a second positioning reference signal pair corresponding to the second time difference,
wherein the second positioning reference signal pair comprises a second uplink positioning reference signal and a second downlink positioning reference signal that have an association relationship, and
wherein the second time difference is a time difference between a sending time point of the second uplink positioning reference signal and a receiving time point of the second downlink positioning reference signal.

4. The method according to claim 3, further comprising:
receiving the second message from the network device.

5. The method according to claim 1, wherein the time difference information comprises:
first time difference information including the first time difference corresponding to a first positioning reference signal pair; and
second time difference information including the first time difference corresponding to a second positioning reference signal pair.

6. The method according to claim 1, wherein the time difference information comprises:
first time difference information corresponding to a first positioning reference signal pair; and
second time difference information corresponding to a second positioning reference signal pair; and
wherein the related downlink positioning reference signal in the first positioning reference signal pair and the related downlink positioning reference signal in the second positioning reference signal pair are for a same cell.

7. The method according to claim 1, wherein the time difference information comprises:
first time difference information corresponding to a first positioning reference signal pair; and
second time difference information corresponding to a second positioning reference signal pair; and
wherein the first uplink positioning reference signal in the first positioning reference signal pair and the first uplink positioning reference signal in the second positioning reference signal pair are a same uplink positioning reference signal.

8. The method according to claim 1, wherein the time difference information further comprises a multi-path time difference corresponding to the related downlink positioning reference signal.

9. A communication apparatus, comprising:
a non-transitory computer-readable medium including computer-executable instructions; and
a processor configured to execute the computer-executable instructions to cause the communication apparatus to carry out a method for positioning the communication apparatus in communication with a network device, the method comprising:
determining a first time difference;
generating a first message comprising time difference information, wherein the time difference information comprises:
the first time difference, and
an identifier of a related downlink positioning reference signal that is a downlink positioning signal of a positioning reference signal pair,
wherein the first time difference corresponds to the related downlink positioning reference signal,
wherein the positioning reference signal pair comprises:
a first uplink positioning reference signal, and
a first downlink positioning reference signal; and
wherein the first time difference is a time duration between a first time point and a second time point, wherein:

the first time point is a time point at which the terminal device receives, via the first downlink positioning signal, a downlink subframe, and the second time point is a time point at which the terminal device transmits an uplink subframe that is closest in time to the first time point; and sending the first message to the network device, wherein the first message, after receipt by the network device, is provided to a positioning function for use in determining the positioning of the communication apparatus.

10. The apparatus according to claim 9, wherein the method further comprises:

receiving configuration information from the network device, wherein the configuration information is used to indicate a configuration resource of the first downlink positioning reference signal that corresponds to the first uplink positioning reference signal and that is in a plurality of downlink positioning reference signals.

11. The apparatus according to claim 10, wherein the method further comprises:

sending positioning capability information of the apparatus to one or more network devices, wherein the positioning capability information comprises one or more pieces of information taken from the group consisting of:

capability information used to indicate whether the apparatus supports cross-frequency round-trip time (RTT) measurement reporting, information about an uplink frequency and a downlink frequency that are supported by the apparatus, capability information used to indicate whether the apparatus supports multi-antenna panel RTT measurement reporting, capability information used to indicate whether the apparatus supports multi-path RTT measurement reporting, and capability information used to indicate whether the apparatus supports blind detection of a synchronization signal block (SSB) used for positioning.

12. The apparatus according to claim 9, wherein the time difference information comprises:

first time difference information including the first time difference corresponding to a first positioning reference signal pair; and second time difference information including the first time difference corresponding to a second positioning reference signal pair.

13. The apparatus according to claim 9, wherein the time difference information comprises:

first time difference information corresponding to a first positioning reference signal pair; and second time difference information corresponding to a second positioning reference signal pair; and wherein the related downlink positioning reference signal in the first positioning reference signal pair and the related downlink positioning reference signal in the second positioning reference signal pair are for a same cell.

14. The apparatus according to claim 9, wherein the time difference information comprises:

first time difference information corresponding to a first positioning reference signal pair; and second time difference information corresponding to a second positioning reference signal pair; and wherein the first uplink positioning reference signal in the first positioning reference signal pair and the first uplink positioning reference signal in the second positioning reference signal pair are a same uplink positioning reference signal.

15. The apparatus according to claim 9, wherein the time difference information further comprises a multi-path time difference corresponding to the related downlink positioning reference signal.

16. A computer-readable storage medium, storing instructions, wherein when the instructions are executed by a processor of an apparatus, the apparatus is enabled to perform a method for positioning the apparatus in communication with a network device, the method comprising:

determining a first time difference;

generating a first message comprising time difference information, wherein the time difference information comprises:

the first time difference, and an identifier of a related downlink positioning reference signal that is a downlink positioning signal of a positioning reference signal pair, wherein the first time difference corresponds to the related downlink positioning reference signal, wherein the positioning reference signal pair comprises:

a first uplink positioning reference signal, and a first downlink positioning reference signal; and wherein the first time difference is a time duration between a first time point and a second time point, wherein:

the first time point is a time point at which the terminal device receives, via the first downlink positioning signal, a downlink subframe, and the second time point is a time point at which the terminal device transmits an uplink subframe that is closest in time to the first time point; and sending the first message to the network device, wherein the first message, after receipt by the network device, is provided to a positioning function for use in determining the positioning of the communication apparatus.

17. The computer-readable storage medium of claim 16, wherein the time difference information comprises:

first time difference information including the first time difference corresponding to a first positioning reference signal pair; and second time difference information including the first time difference corresponding to a second positioning reference signal pair.

18. The computer-readable storage medium of claim 16, wherein the time difference information comprises:

first time difference information corresponding to a first positioning reference signal pair; and second time difference information corresponding to a second positioning reference signal pair; and wherein the related downlink positioning reference signal in the first positioning reference signal pair and the related downlink positioning reference signal in the second positioning reference signal pair are for a same cell.

19. The computer-readable storage medium of claim 16, wherein the time difference information comprises:

first time difference information corresponding to a first positioning reference signal pair; and second time difference information corresponding to a second positioning reference signal pair; and wherein the first uplink positioning reference signal in the first positioning reference signal pair and the first uplink positioning reference signal in the second positioning reference signal pair are a same uplink positioning reference signal.

20. The computer-readable storage medium of claim 16, wherein the time difference information further comprises a multi-path time difference corresponding to the related downlink positioning reference signal.

* * * * *